US010318093B2

(12) United States Patent
Lim

(10) Patent No.: US 10,318,093 B2
(45) Date of Patent: Jun. 11, 2019

(54) METHOD AND APPARATUS FOR MESSAGE PROCESSING

(71) Applicant: Samsung Electronics Co., Ltd., Gyeonggi-do (KR)

(72) Inventor: Ji-Hong Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 14/340,475

(22) Filed: Jul. 24, 2014

(65) Prior Publication Data

US 2015/0033151 A1    Jan. 29, 2015

(30) Foreign Application Priority Data

Jul. 24, 2013    (KR) .................. 10-2013-0087438

(51) Int. Cl.
*G06F 3/0481* (2013.01)
*G06F 3/0485* (2013.01)
*H04M 1/725* (2006.01)
*G06Q 10/10* (2012.01)

(52) U.S. Cl.
CPC .......... *G06F 3/0481* (2013.01); *G06F 3/0485* (2013.01); *G06F 3/04817* (2013.01); *G06Q 10/107* (2013.01); *H04M 1/72547* (2013.01); *H04M 1/72552* (2013.01); *H04M 1/72555* (2013.01)

(58) Field of Classification Search
CPC ............................. G06F 3/0481; G06F 3/0485
USPC ....................................................... 715/753
See application file for complete search history.

(56) References Cited

U.S. PATENT DOCUMENTS

| 2005/0021624 | A1* | 1/2005 | Herf ................... H04L 12/1822 709/204 |
| 2007/0156910 | A1* | 7/2007 | Christie ................. H04L 51/04 709/227 |
| 2007/0174791 | A1  | 7/2007 | Park et al. |
| 2009/0222765 | A1* | 9/2009 | Ekstrand ............... G06F 3/0485 715/818 |
| 2011/0074824 | A1* | 3/2011 | Srinivasan .......... G06F 3/04883 345/660 |

(Continued)

FOREIGN PATENT DOCUMENTS

| CN | 101005547 A | 7/2007 |
| CN | 102487362 A | 6/2012 |

(Continued)

OTHER PUBLICATIONS

Office Action dated Jul. 2, 2018 in connection with Chinese Patent Application No. 201410354043.X.

*Primary Examiner* — Tadesse Hailu
*Assistant Examiner* — Darrin Hope

(57) ABSTRACT

A method for displaying messages includes receiving a first message, displaying a first data corresponding to the first message in a first line on a screen, receiving a second message, and displaying a second data corresponding to the second message in the first line on the a left or right side of the first data. An electronic device includes a memory, and one or more processors, wherein the one or more processors are configured to receive a first message, display a first data corresponding to the first message in a first line on a screen, receive a second message, and display a second data corresponding to the second message in the first line on the a left or right side of the first data.

20 Claims, 19 Drawing Sheets

(56) References Cited

U.S. PATENT DOCUMENTS

| | | |
|---|---|---|
| 2012/0297321 A1 | 11/2012 | Douglas et al. |
| 2013/0191761 A1 | 7/2013 | Zhang et al. |
| 2013/0227485 A1* | 8/2013 | Freyhult ............ G06F 17/30991 715/825 |
| 2014/0137013 A1* | 5/2014 | Matas .................... G06F 3/0488 715/764 |

FOREIGN PATENT DOCUMENTS

| | | |
|---|---|---|
| KR | 10-2007-0025184 | 3/2007 |
| KR | 10-2009-0119124 | 11/2009 |

\* cited by examiner

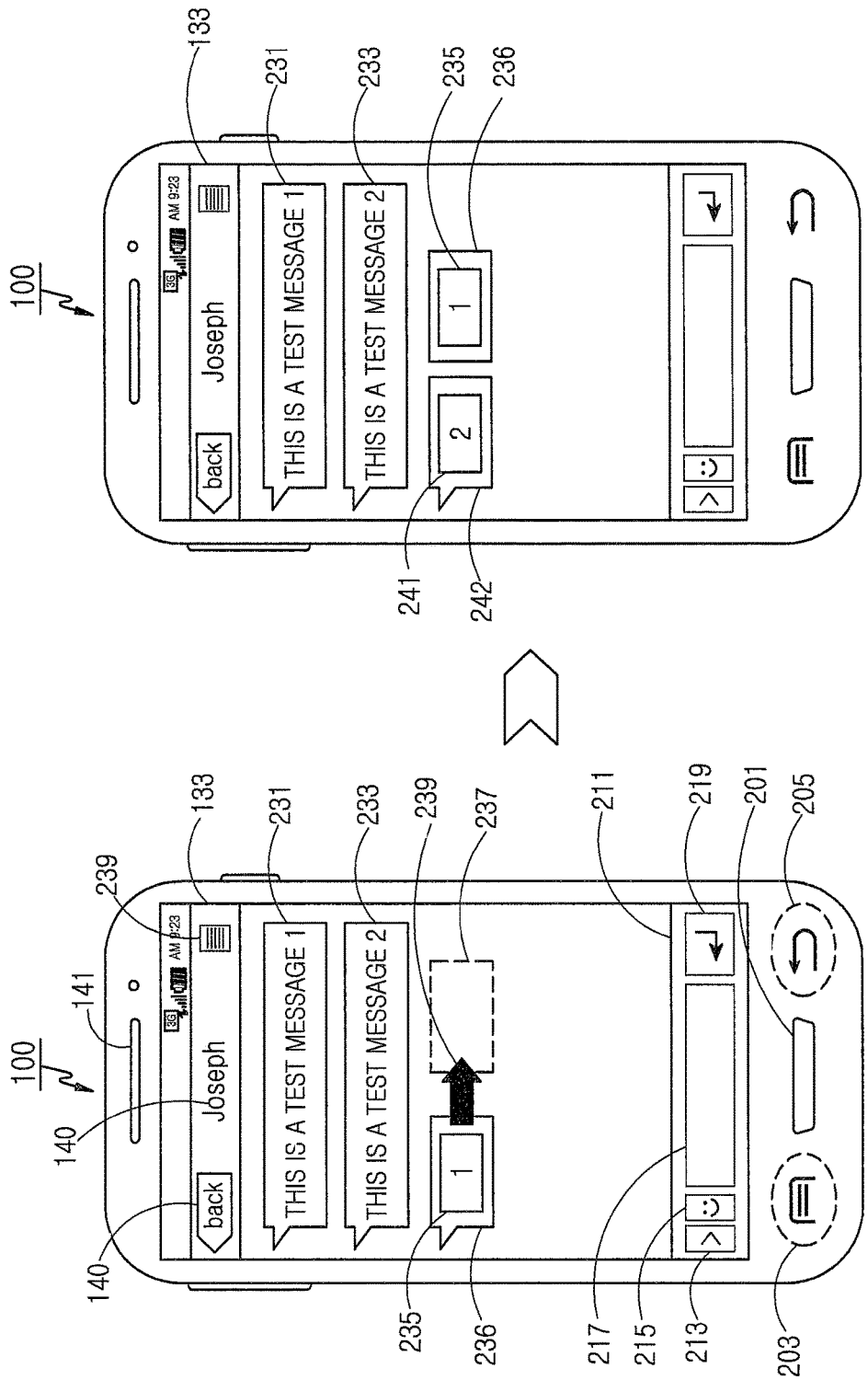

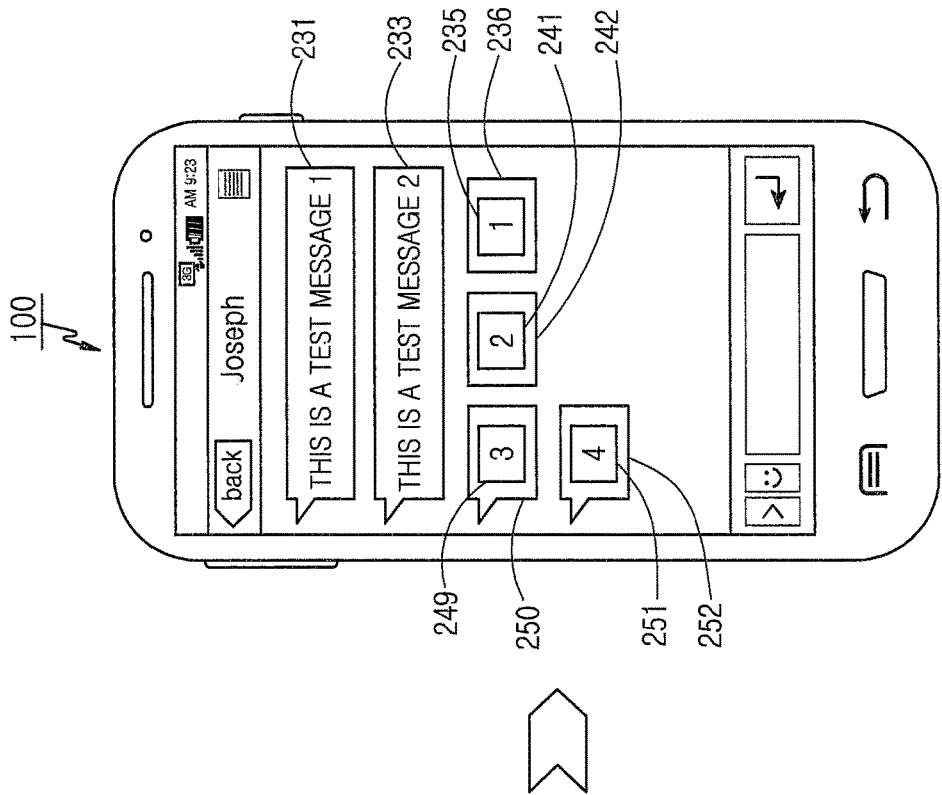
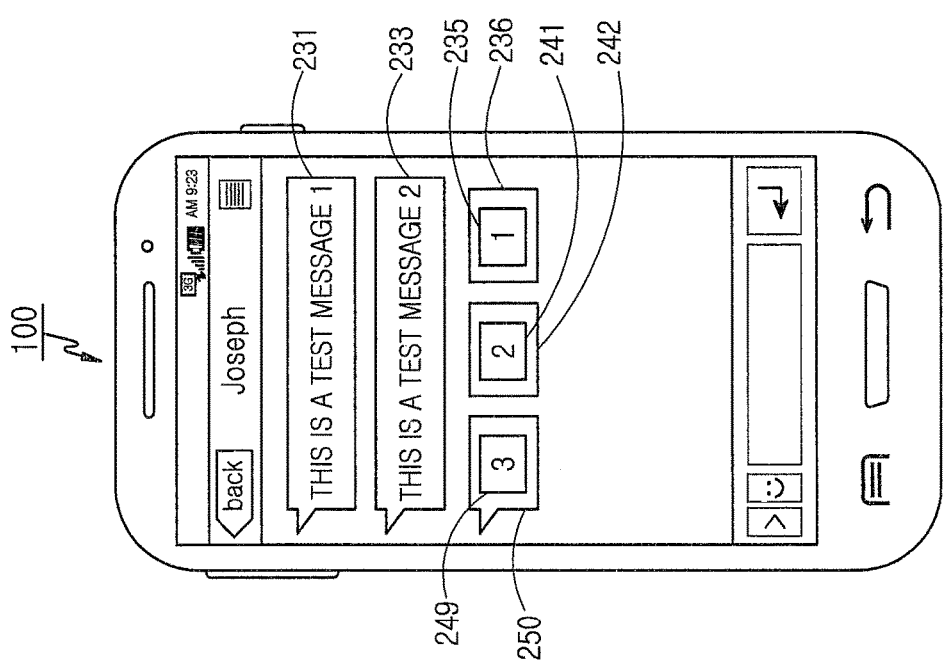
FIG.2C-1
FIG.2C-2

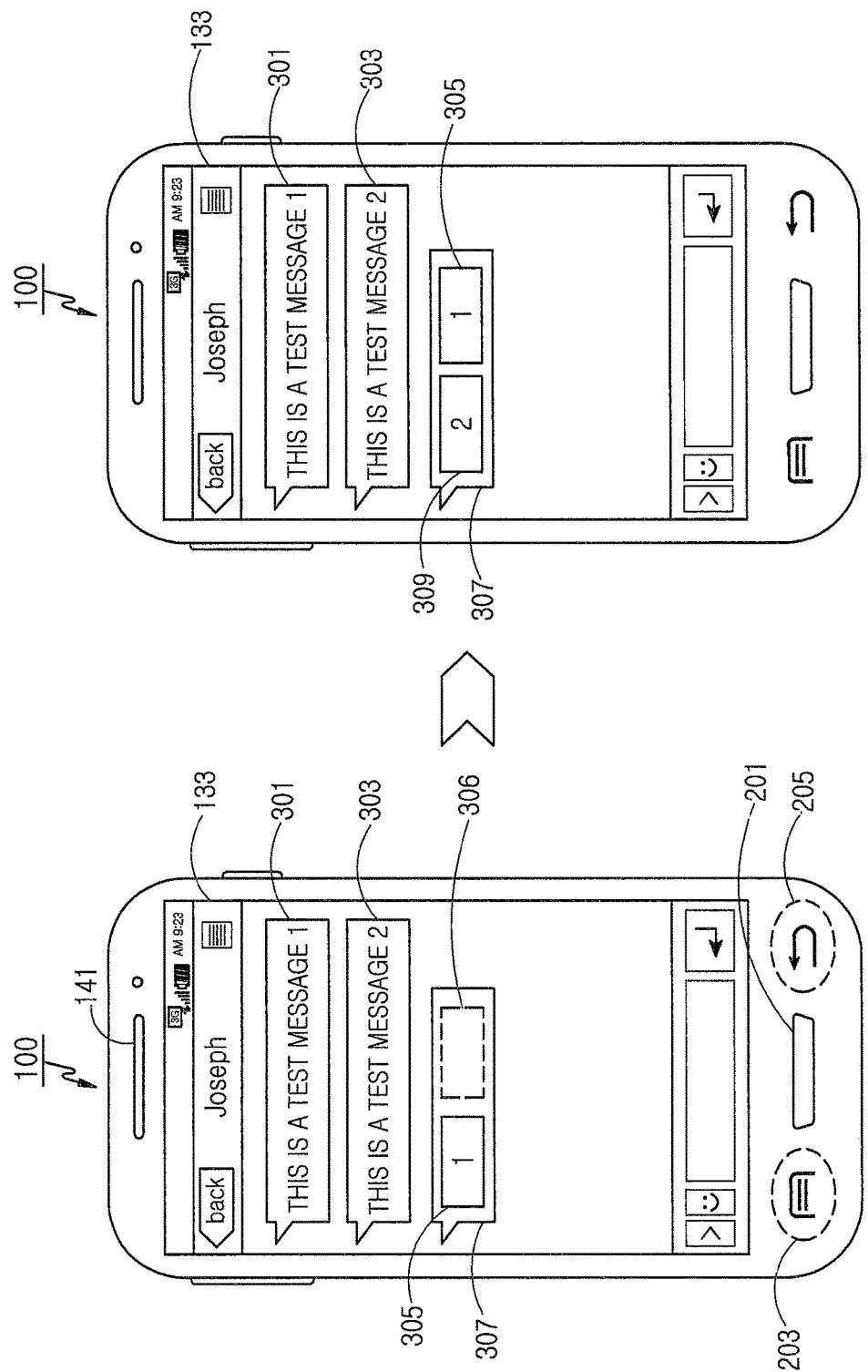

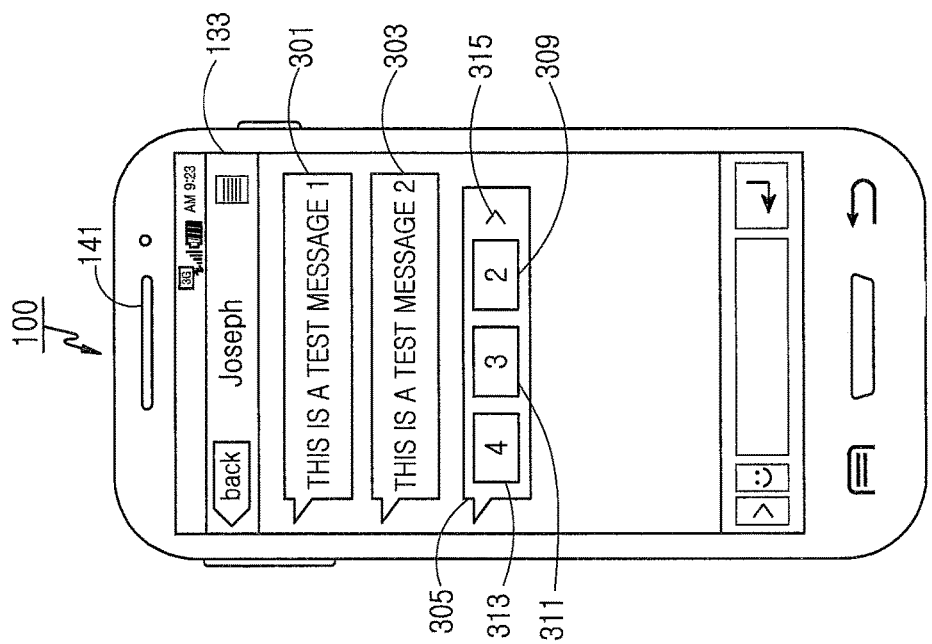
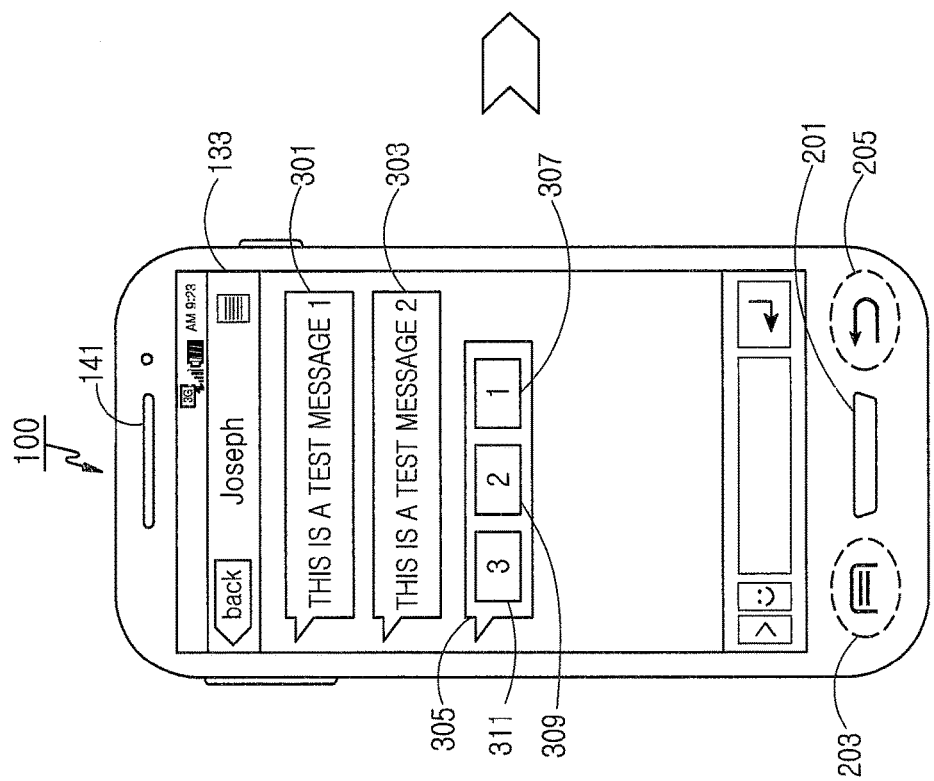

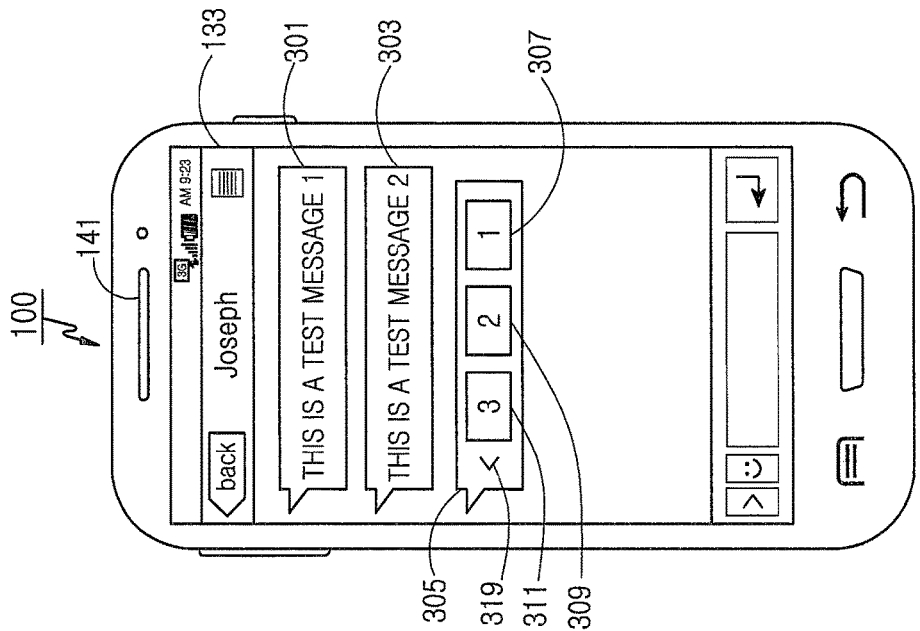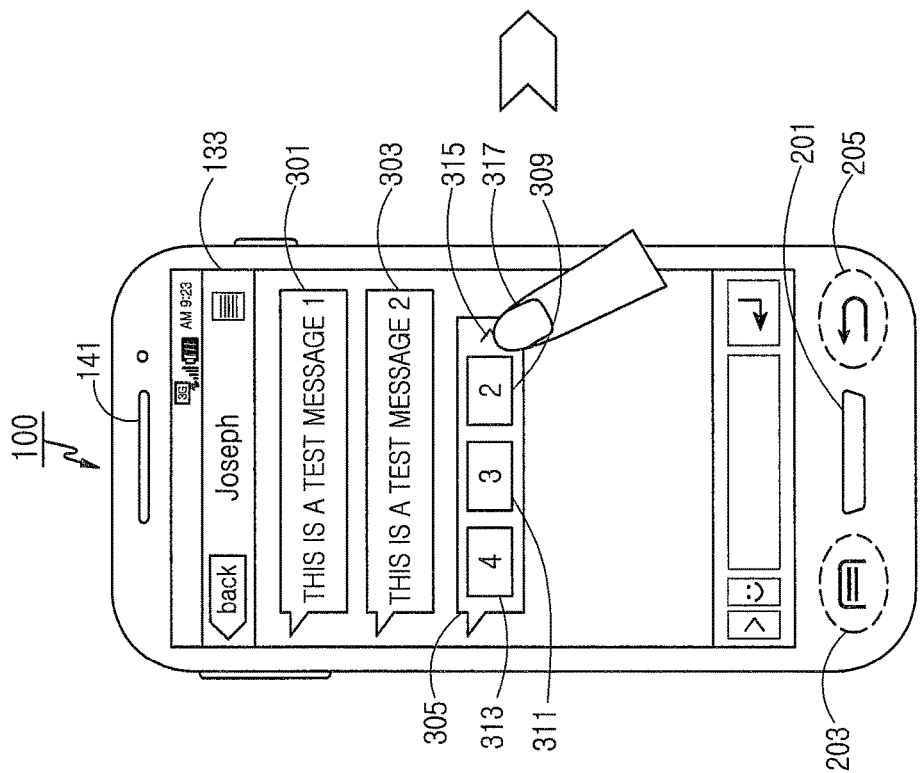
FIG.3C-1
FIG.3C-2

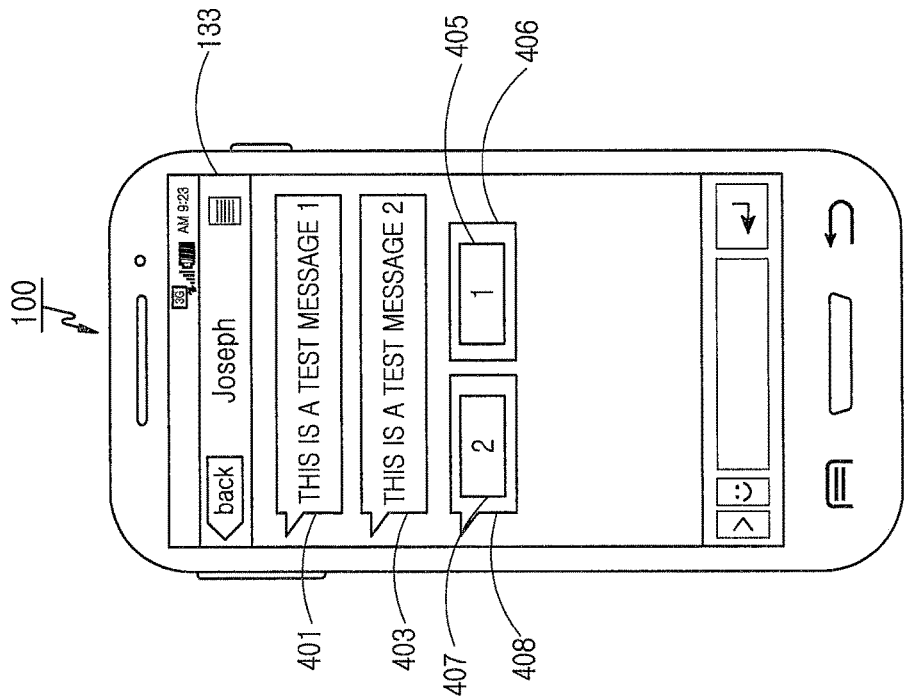
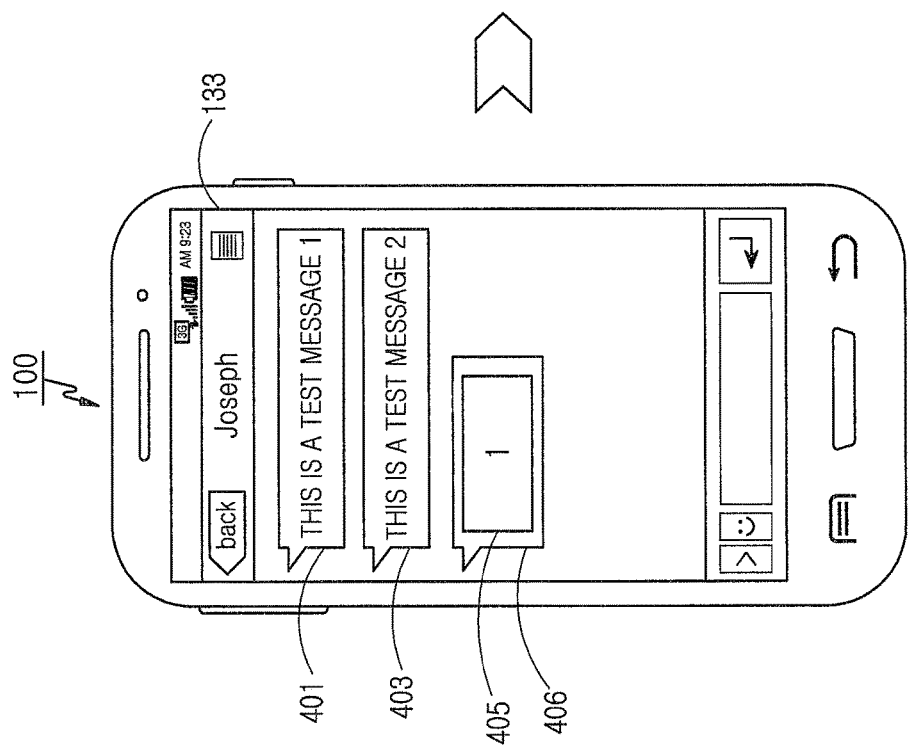
FIG.4B
FIG.4A

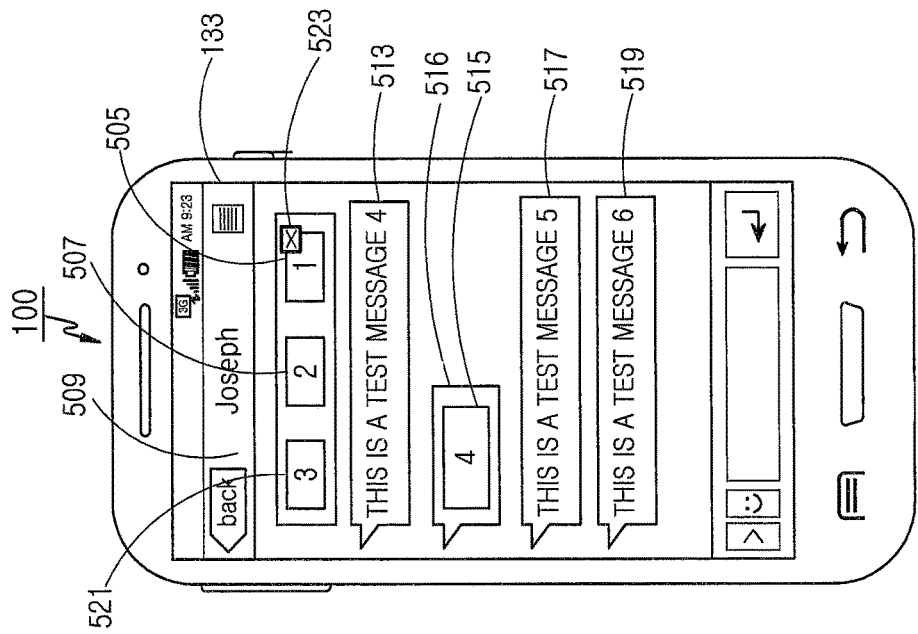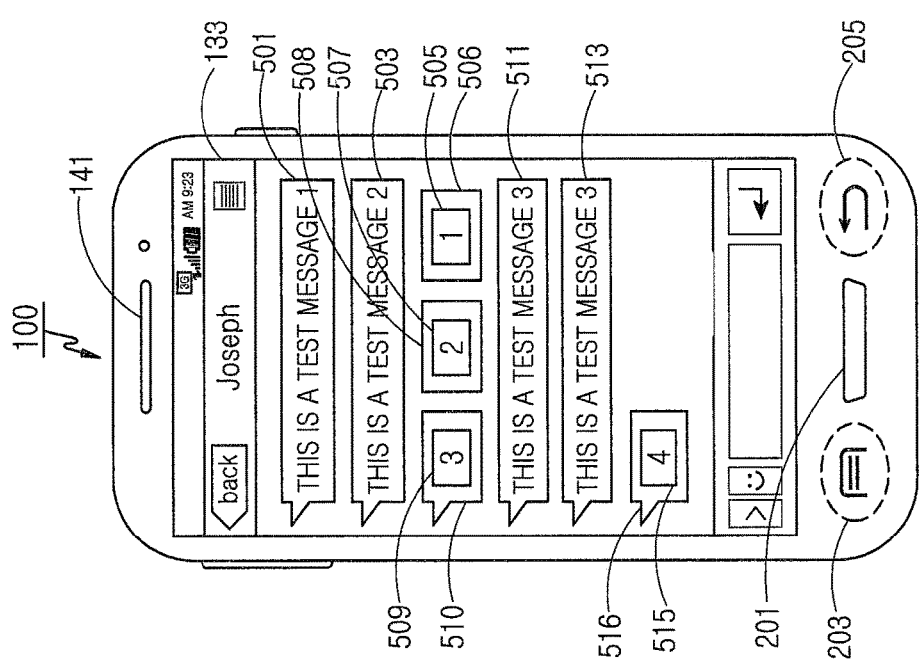
FIG.5A-2
FIG.5A-1

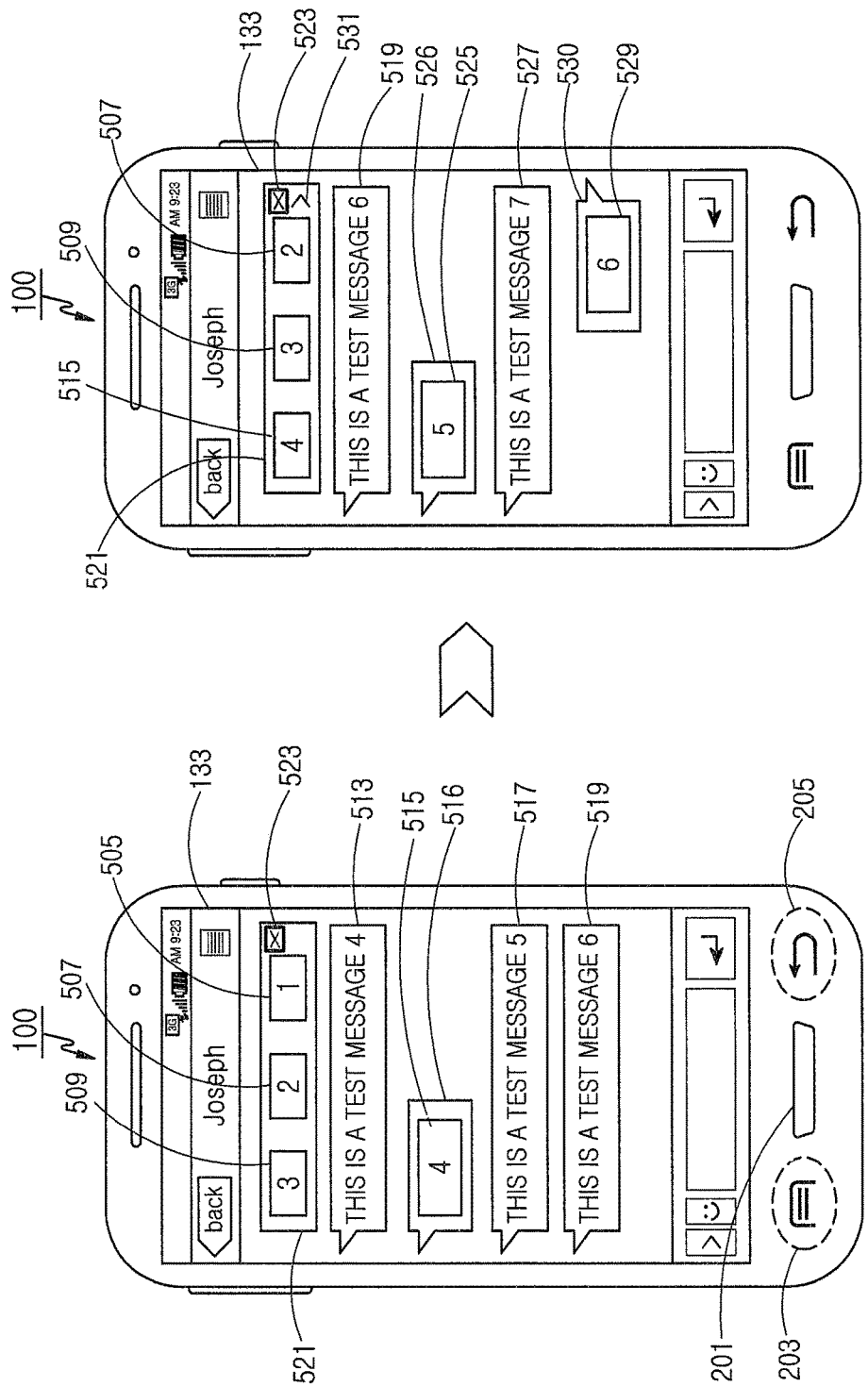

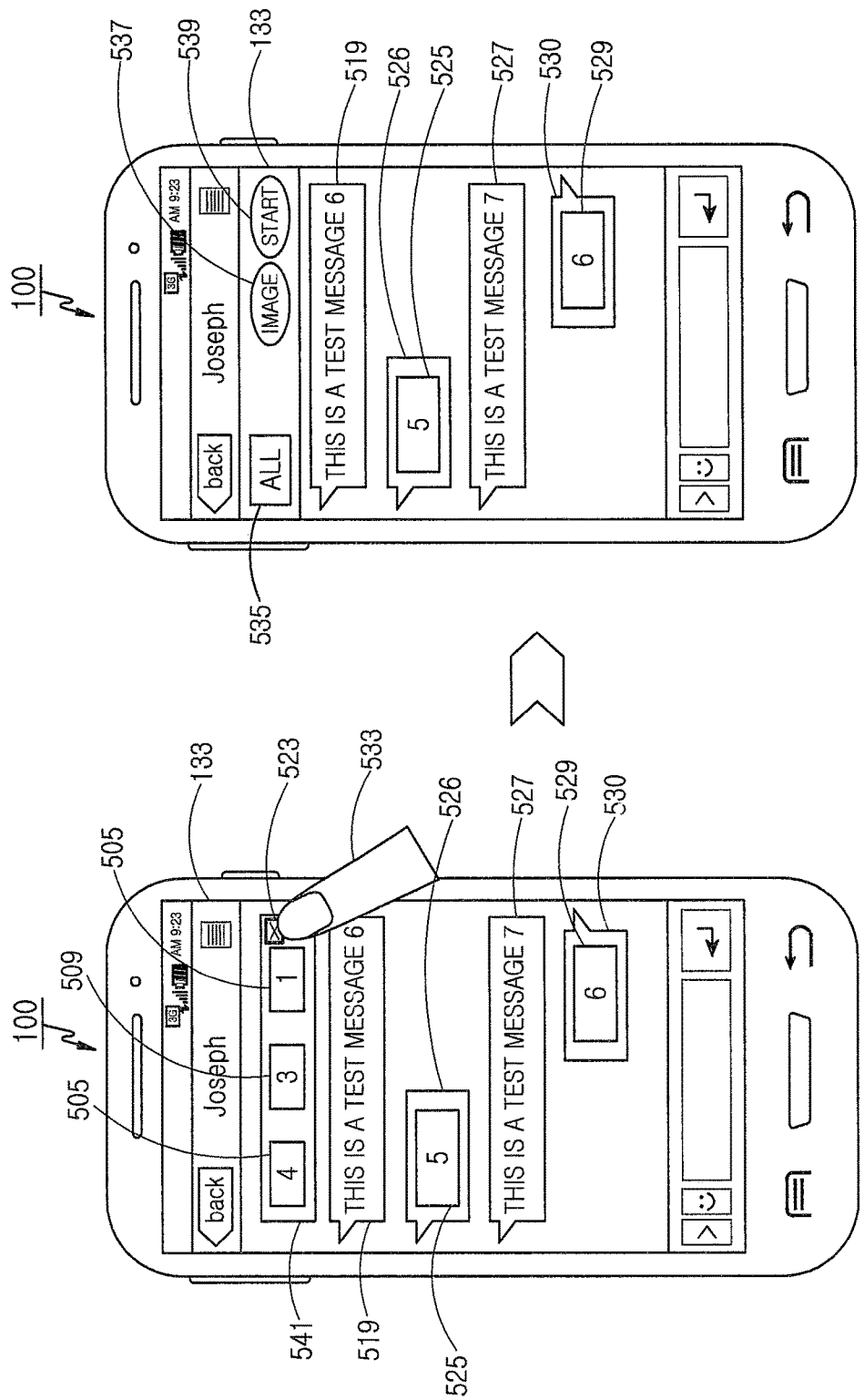

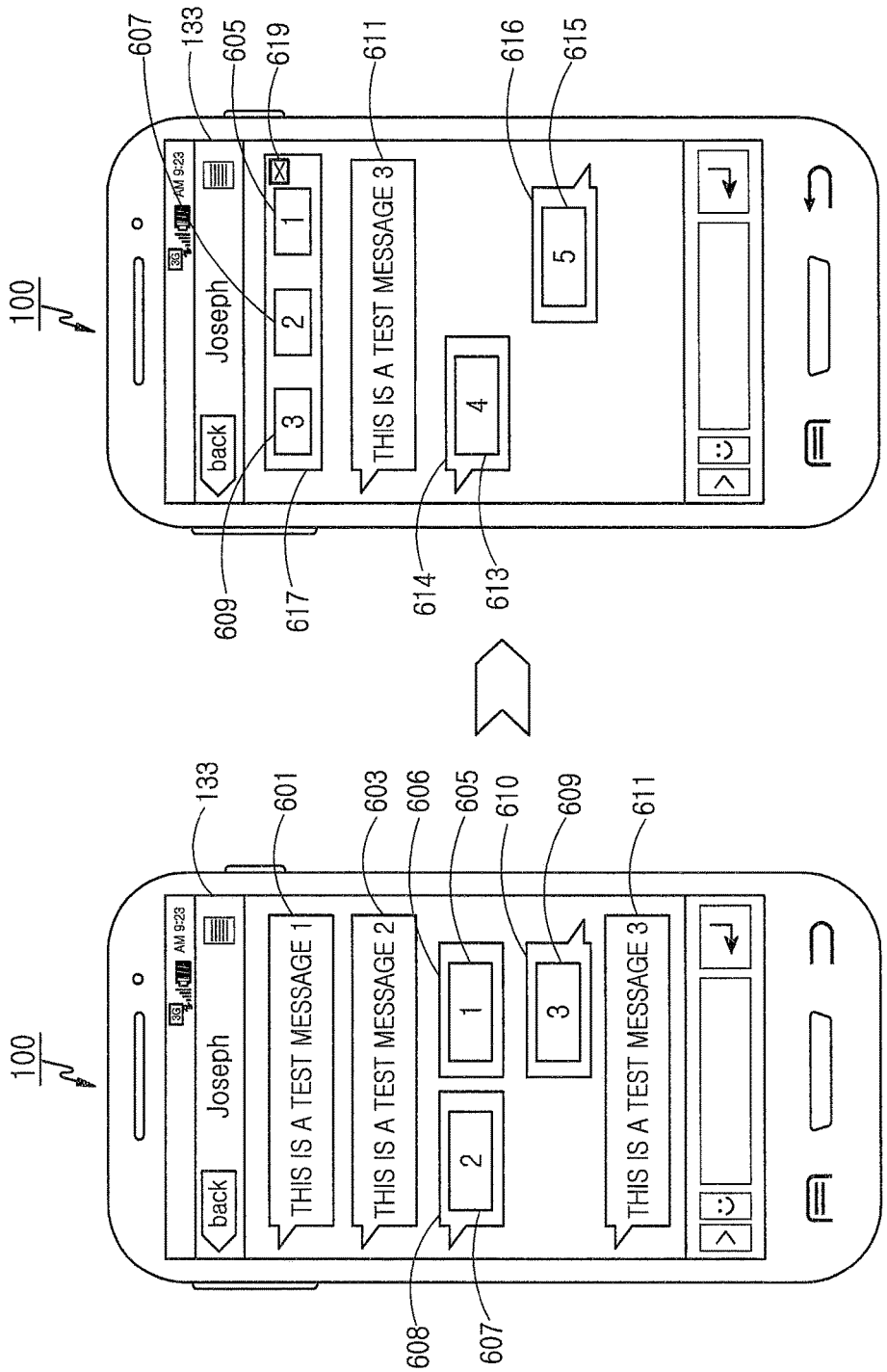

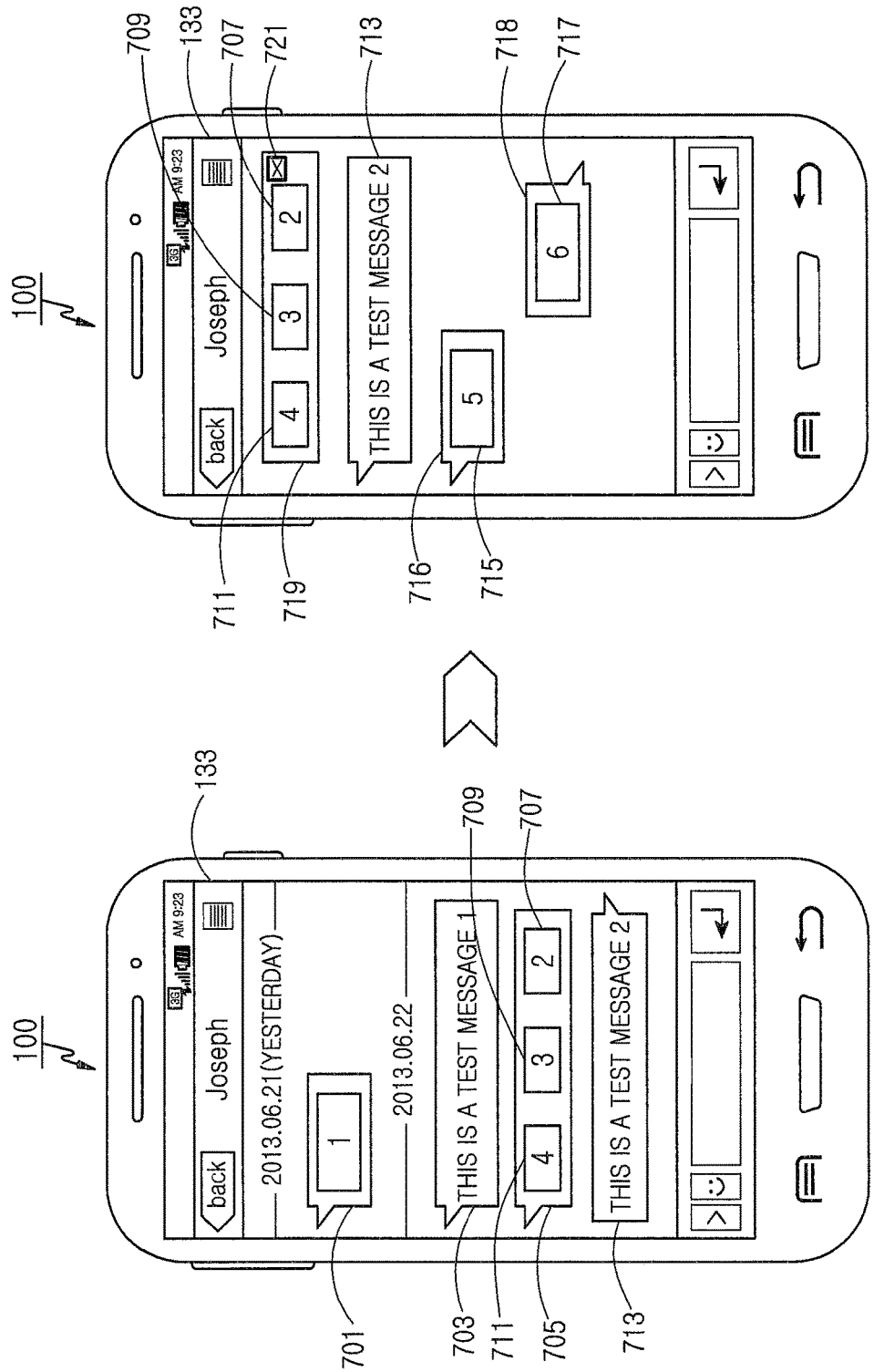

METHOD AND APPARATUS FOR MESSAGE PROCESSING

PRIORITY

The present application is related and claims the benefit under 35 U.S.C. § 119(a) of a Korean patent application No. 10-2013-0087438 filed in the Korean Intellectual Property Office on Jul. 24, 2013, the entire disclosure of which is hereby incorporated by reference.

TECHNICAL FIELD

The present disclosure relates to a method and electronic device for message processing.

BACKGROUND

With the development of a mobile communication technique, an electronic device is used as an essential communication device of individual users. Moreover, in addition to a voice communication function of the electronic device, the electronic device provides various additional services such as a camera function, a data communication function, a video playback function, an audio playback function, a messenger function, a scheduling function, an alarm function, and the like Therefore, various programs capable of using these functions are used, and a method for communication between users becomes more various.

Conventionally, in order to confirm messages moved out of a message display area among messages displayed in the message display area of a received Social Networking Service (SNS) message program, the electronic device scrolls the message display area in an up/down or left/right direction to discover a desired portion from the message display area in which a text message and a multimedia message are displayed together.

SUMMARY

To address the above-discussed deficiencies, it is a primary object to provide at least the advantages described below. Accordingly, an aspect of the present disclosure is to provide a method and apparatus for effectively displaying messages and data received in an electronic device and for confirming the display by a simple manipulation.

A method in an electronic device is provided. The method includes receiving a first message, displaying a first data corresponding to the first message in a first line (row) on a screen, receiving a second message, and displaying a second data corresponding to the second message in the first line (row) on the a left or right side of the first data.

In some embodiments, a data is a thumbnail image acquired from a message.

In some embodiments, the first image data and the second image data are displayed in a message container.

In some embodiments, the message container comprises a scroller to scroll a plurality of messages.

In some embodiments, displaying the second data includes displaying the second data at a left end of the screen, and moving and displaying the first data on a right side of the second data.

In some embodiments, displaying the second data includes displaying the second data at a right end of the screen, and moving and displaying the first data on a left side of the second data.

In some embodiments, displaying the second data includes the first data and the second data are displayed in a same size.

In some embodiments, when the first line is filled with a plurality of data, a next data is displayed in a second line.

In some embodiments, the method further includes classifying the data into a plurality of categories, and displaying each categorized data in each notification window.

In some embodiments, the thumbnail image represents one of still image message, moving image message, audio message, and an emoticon.

In some embodiments, the method further includes changing the displayed notification window in a display released or hidden state by selecting an indication displayed in the notification window.

An electronic device includes a memory, and one or more processors, wherein the one or more processors are configured to receive a first message, display a first data corresponding to the first message in a first line (row) on a screen, receive a second message, and display a second data corresponding to the second message in the first line (row) on the a left or right side of the first data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A-1 to FIG. 2D-2 illustrate displaying received images in a row on a screen in an electronic device according to various embodiments of FIG. 1;

FIG. 3A-1 to FIG. 3D-2 illustrate displaying images in a row on a screen in an electronic device according to various embodiments of FIG. 1;

FIGS. 4A and 4B illustrate displaying received images in a row on a screen in an electronic device according to various embodiments of FIG. 1;

FIG. 5A-1 to FIG. 5C-2 illustrate displaying received images in a row on a screen in an electronic device according to various embodiments of FIG. 1;

FIGS. 6A and 6B illustrate displaying transmitted/received images in a row on a screen in an electronic device according to various embodiments of FIG. 1;

FIGS. 7A and 7B illustrate displaying received images in a row in an electronic device according to various embodiments of FIG. 1;

DETAILED DESCRIPTION

Figure 1:
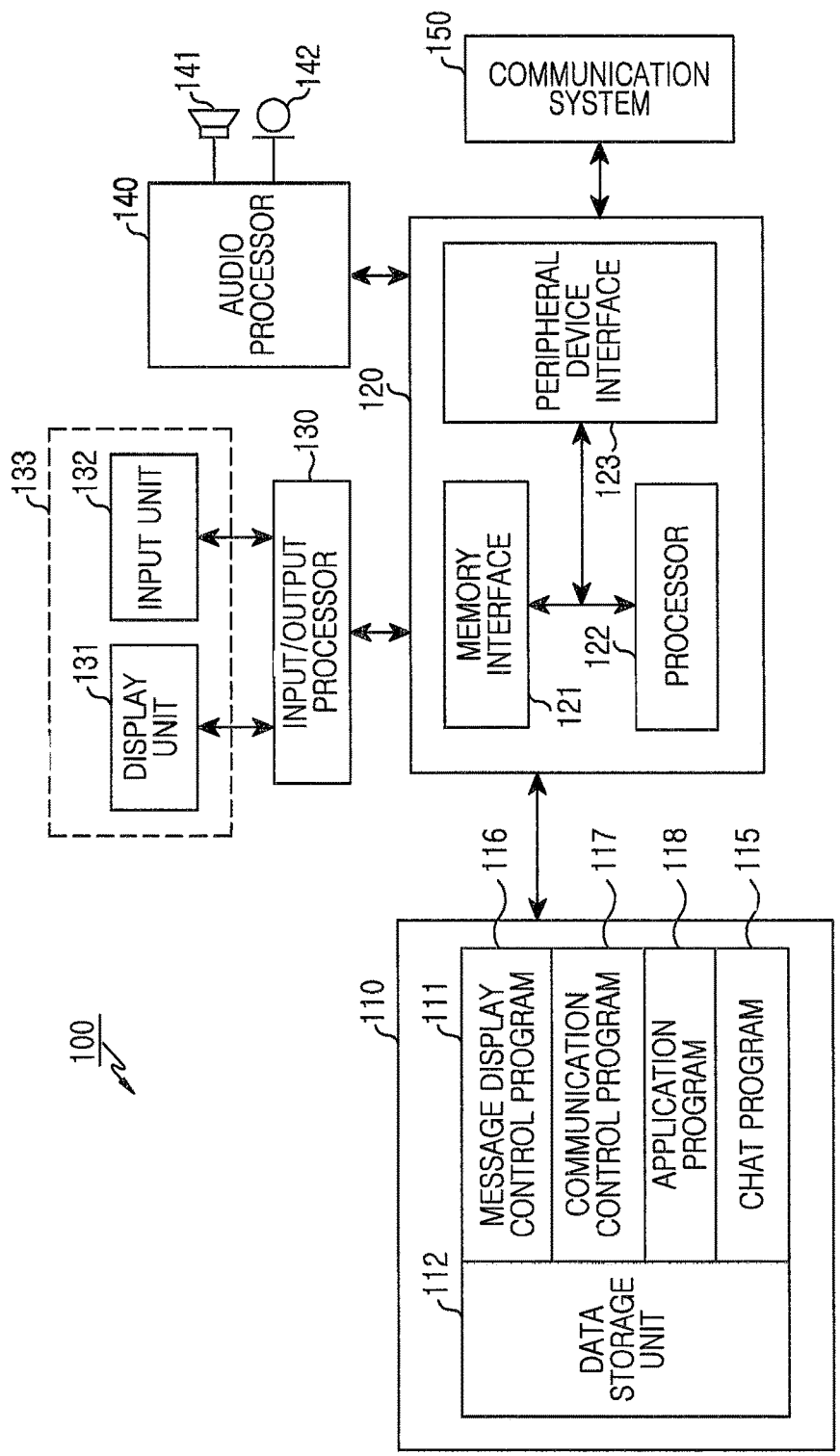
FIG. 1 is a block diagram of an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Various embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

In the description of various embodiments of the present disclosure, an electronic device may be described by assuming a touch screen capable of performing an input process based on an input unit and a display process based on a display unit in one physical screen. Although the display unit and the input unit are separately illustrated in the structure of the device in the present disclosure, it is also possible that the display unit includes the input unit or that the input unit is represented by the display unit. Further, the present disclosure is not limited only to the electronic device including the touch screen. Rather, the present disclosure can also apply to a case where the display unit and the input unit are physically separated or apply to various electronic devices including only one of the display unit and the input unit. Hereinafter, in various embodiments, a device represented by a touch screen can be a touch screen including a touch input unit and a display unit, or an electronic device including a display unit such as a display unit not including a touch input unit or a display unit including an input unit.

When a component is mentioned as being "connected" to or "accessing" another component, this can mean that it is directly connected to or accessing the other component, but it is to be understood that there are no intervening components present. On the other hand, when a component is mentioned as being "directly connected" to or "directly accessing" another component, it is to be understood that there are no intervening components present.

When "consecutively" or "is consecutive" is mentioned after a first operation is performed and then a second operation is performed, it is to be understood that the second operation can be performed without a time delay or with a specific time delay after the first operation is performed.

An electronic device according to the present disclosure can be one or more combinations of various devices such as a mobile communication terminal, a Personal Digital Assistant (PDA), a Personal Computer (PC), a laptop, a smart phone, a smart TeleVision (TV), a netbook computer, a Mobile Internet Device (MID), a Ultra Mobile Personal Computer (UMPC), a tablet PC, a mobile pad, a media player, a handheld computer, a Motion Picture Experts Group Layer 3 Player (MP3P), a video phone, an e-book reader, a Portable Multimedia Player (PMP), a mobile medical device, an electronic accessory, an electronic appcessory, a camera, a wearable device, an electronic clock, a wrist watch, a refrigerator, an air conditioner, a cleaner, an artificial intelligent robot, an audio machine, an oven, a microwave oven, a washing machine, an electronic bracelet, an electronic necklace, an air purifier, an electronic picture frame, a set-top box, a TV box (e.g., Samsung HomeSync™, Apple TV™, or Google TV™), an electronic dictionary, a car infotainment device, an electronic equipment for ship (e.g., a vessel navigation device, a gyro compass, and the like), avionics, a security device, an electronic costume, an electronic key, a camcorder, game consoles, various medical devices (e.g., Magnetic Resonance Angiography (MRA), Magnetic Resonance Imaging (MRI), Computed Tomography (CT), imaging equipment, ultrasonic instrument, and the like), a TV, a Digital Video Disk (DVD) player, a navigation device, a Global Positioning System (GPS) receiver, an Event Data Recorder (EDR), a Flight Data Recorder (FDR), a Head-Mounted Display (HMD), a flat panel display device, an electronic album, a furniture or a part of building/ constructions including the electronic device, an electronic board, an electronic signature receiving device, a projector, and the like It is apparent to those ordinarily skilled in the art that the electronic device according to the present disclosure is not limited to the aforementioned devices.

FIG. 1 is a block diagram of an electronic device according to various embodiments of the present disclosure.

Referring to FIG. 1, an electronic device 100 includes a memory 110 and a processor unit 120. A peripheral device can include an input/output processor 130, an input/output unit 133 including a display unit 131 and an input unit 132, an audio processor 140, a communication system 150, and other peripheral devices.

Each constitutional element is described hereinafter.

The memory 110 includes a program storage unit 111 for storing a program for controlling an operation of the electronic device 100 and a data storage unit 112 for storing data generated during the program is executed. Data generated by the program can be stored by the operation of a processor 122.

When the electronic device 100 processes data of the program, the data storage unit 112 can store a program function, a program purpose, a keyword, an IDentification (ID) code, and information regarding peripheral devices of the electronic device 100 and usable by the program.

For example, the electronic device 100 can store converted text data if a voice of multimedia data is converted to a text, and can store partial voice data if a duration of the text is selected to determine partial voice data corresponding to the selected text duration.

The program storage unit 111 can include a chat program 115, a message display control program 116, a communication control program 117, and at least one application program 118. The programs included in the program storage unit 111 can consist of a group of instructions and thus can be expressed in an instruction set.

The chat program 115 can transmit/receive text data or multimedia data with respect to a second electronic device (not shown) and display the data to a message display area of the touch screen (or input/output unit) 133, and can transmit/receive a recorded voice message and display the message to the electronic device 100 and the second electronic device.

The chat program 115 can provide not only a 1:1 chat service but also a multi-user chat service by defining a group. In case of providing the multi-user chat service, the electronic device 100 can transmit data to multiple users who participate in chatting by transmitting/receiving data only one time.

The chat program 115 can output multimedia data such as moving image data, still image data, audio data, and the like, via the electronic device 100 according to various interworking application programs (which can be provided in a plug-in form).

The message display control program 116 can control a method of displaying transmission/reception data displayed in a message display area via the chat program 115. The message display control program 116 can display two or more pieces of image data, consecutively transmitted or received, in a row to the message display area.

If the image data consecutively transmitted or received cannot be displayed in a row to the message display area of the chat program 115, the message display control program 116 can determine a size of at least one piece of image data, and can display the image data in a row by determining a size of the remaining pieces of image data to the determined size.

If the image data displayed in the message display area of the chat program 115 is scrolled off the message display area, the message display control program 116 can display images moved out of the message display area by generating an additional notification window in a specific area of the message display area.

The message display control program 116 can be provided as an additional program to control the chat program 115, or can be provided in a plug-in form to interwork with the chat program 115.

The communication control program 117 can include at least one software constitutional element for controlling communication with at least one peer electronic device by using the communication system 150.

For example, the communication control program 117 can search for the peer electronic device for a communication connection. If the peer electronic device for the communication connection is found, the communication control program 117 can establish a connection for communication with the peer electronic device. The communication control program 117 can perform a capability search and session establishment procedure with respect to the connected peer electronic device to provide a control of data transmission/reception with respect to the peer electronic device via the communication system 150.

The application program 118 can include software constitutional elements for at least one application installed in the memory 110 of the electronic device 100.

The memory 110 included in the electronic device 100 can consist of one or more units. According to one embodiment, on the basis of a usage, the memory 110 can function only as the program storage unit 111, can function only as the data storage unit 112, or can function as both of the two. According to a feature of the electronic device 100, a physical area inside the memory 110 may not be clearly divided.

The processor unit 120 can include a memory interface 121, at least one processor 122, and a peripheral device interface 123. Herein, the memory interface 121, at least one processor 122, and peripheral device interface 123 included in the processor unit 120 can be integrated in at least one circuit or can be implemented as separate constitutional elements.

The memory interface 121 can control an access to the memory 110 of a constitutional element such as the processor 122 or the peripheral device interface 123.

The peripheral device interface 123 can control a connection of the processor 122 and the memory interface 121 with respect to an input/output peripheral device of the electronic device 100.

The processor 122 can control the electronic device 100 to provide various multimedia services by using at least one software program, can control the display unit 131 to perform a display operation to confirm a User Interface (UI) operation of the electronic device 100 via the input/output processor 130, and can control the input unit 132 to provide a service for receiving an instruction input from an external device of the electronic device 100. The processor 122 can execute at least one program stored in the memory 110 to provide a service corresponding to the program.

The input/output processor 130 can provide an interface between the peripheral device interface 123 and the input/output unit 133 such as the display unit 131 and the input unit 132.

The display unit 131 can constitute a UI operation by receiving state information of the electronic device 100, a character which is input from the external device, a moving image, or a still image from the processor unit 120 and can display it via the input/output processor 130.

The input unit 132 can provide input data generated by a user's selection to the processor unit 120 via the input/output processor 130.

For example, the input unit 132 can consist of only a control button to receive data for the control from an external element of the electronic device 100, or can consist of a keypad.

Further, the input unit 132 can be provided as the input/output unit 133 together with the display unit 131 so that input/output operations can be performed in one screen. In this case, the input unit 132 used in the touch screen can use one or more of a capacitive type, a resistance (or pressure sensitive) type, an infrared type, an electro inductive type, and an ultrasonic type.

Furthermore, in addition to an input mechanism in which the touch screen 133 is directly touched, an input mechanism of the input unit 132 can be an input mechanism of inputting an instruction when an input object is located within a specific distance from the touch screen 133. Terms such as a hovering or floating touch, an indirect touch, a proximity touch, a non-contact input, and the like, can be used.

The input/output unit 133 is a device in which the input unit 132 is coupled on the display unit 131, and can be a touch screen capable of inputting an instruction by touching a screen configuration displayed in the display unit 131 in the operation of the electronic device 100.

Therefore, since the touch screen can perform both a role of the display unit 131 for displaying the UI operation of the electronic device 100 and a role of the input unit 132 for inputting an external instruction to the electronic device 100, in the following description, the touch screen 133 can be configured by including the display unit 131 and the input unit 132.

The audio processor 140 can provide an audio interface between a user and the electronic device 100 via a speaker 141 and a microphone 142.

The communication system 150 performs a communication function. The communication system 150 can perform communication with a peer electronic device by using at least any one of mobile communication via a base station, near field wireless communication (e.g., infrared communication (IrDA), Bluetooth™, Bluetooth Low Energy™ (BLE), WiFi™, Near Field Communication (NFC), Zig-Bee™), wireless Local Area Network (LAN) communication, and wired communication.

In the description of the embodiment of the present disclosure, a display to the electronic device 100 or an output to the electronic device 100 can be a term for indicating a method of displaying a moving image, a still image, or a Graphic User Interface (GUI) operation in the touch screen 133 of the electronic device 100 or outputting audio data such as a signal sound or a voice to the speaker 141. The same meaning can also be used in the following description as to the term 'display' or 'output', and the term can be separately explained if necessary.

FIG. 2A-1 to FIG. 2D-2 illustrate displaying received images in a row in an electronic device according to various embodiments of FIG. 1.

The electronic device 100 can receive first media information and display the information to the touch screen 133. If second media information is received consecutively, the electronic device 100 can determine whether a data type of the first media information is media information. If the data type of the first media information is determined as the media information, the electronic device 100 can display the second media information in a row to an area in which the first media information is displayed.

Hereinafter, one embodiment of the present disclosure will be described with reference to FIG. 2A.

An 'image' such as a 'first image', a 'second image', and the like, displayed by the electronic device 100 to the touch screen 133 or a message display area of the touch screen 133 (hereinafter, a message display area) can be media data such as a moving image, still image (e.g., a picture, a photo, and the like), emoticon, or audio (e.g., voice, music, sound, and the like) included in message data transmitted or received by the electronic device or information on the media data (it can be an address indicating a specific server including or storing the media data or a location of the media data) or can be a thumbnail image acquired from information on the media data. In the following description, 'media data' or 'information on the media data' included in the message data transmitted/received by the electronic device 100 can be defined as 'media information', and the 'media data', 'media information', or 'thumbnail image' displayed in the message display area can be defined as an 'image'.

Referring to FIG. 2A, the electronic device 100 can include the touch screen 133 in a front portion thereof. The touch screen 133 can include the input unit 132. The input unit 132 can input an instruction by dragging the touch screen 133 by the use of an input means to the display unit 131 which displays a content for an operation of the electronic device 100 in a UI form, or by moving the input means at a location separated by a specific distance from the touch screen 133.

Further, the electronic device 100 can include the speaker 141 at an upper portion thereof to output a sound, can include a button 201 at a lower portion thereof to input an instruction via a click, and can include a touch button 203 or 205 at a fixed location to input an instruction via a touch.

Even if the speaker 141, the button 201, or the touch button 203 or 205 is not illustrated, the electronic device 100 can include the speaker 141, the button 201, or the touch button 203 or 205 in the same location or different locations.

The electronic device 100 can transmit/receive data with respect to the second electronic device by using a chat program. The electronic device 100 can receive message data from the second electronic device. The received message data can include text data, media information, and the like The electronic device 100 can display the received message data to the touch screen 133 by determining a message display area with respect to the second electronic device. The message display area can display a name (i.e., Joseph) of a peer user who receives the message data via the second electronic device (as indicated by a reference numeral 223). The message display area with respect to the second electronic device can display one or more of an icon 221 for displaying a higher-level menu of the message display area, an icon 225 for displaying a menu for reconfiguring a configuration menu of the message display area, an icon 213 and/or 215 for providing a menu for displaying various effects that can be added to a transmission message and/or a menu capable of displaying attached data, an area 217 capable of inputting a content of a message to be transmitted, and an icon 219 capable of transmitting the content which is input to the area 217.

In the following description of the embodiment of the present disclosure, it can be assumed that the electronic device 100 transmits/receives message data via the message display area of the chat program 115 with respect to the second electronic device (not shown), and can display a name of the second electronic device (preferably, a user of the second electronic device) as 'Joseph' in the message display area (as indicated by a reference numeral 223).

Referring to FIG. 2A-1, the electronic device 100 can display message data transmitted/received with respect to the second electronic device (not shown) by using the chat program 115 to the message display area of the second electronic device (not shown). If message data including text information 231 indicating 'this is a test message 1' is received from the second electronic device, the electronic device 100 can constitute a message container (hereinafter, bubble) including the message in a specific area of the message display area to display the information 231 indicating 'this is a test message 1', and if message data including text information 233 indicating 'this is a test message 2' is received consecutively, the electronic device 100 can constitute an additional bubble in a specific area of the message display area to display the information 233 indicating 'this is a test message 2'.

After the information 233 indicating 'this is a test message 2' is displayed, if new message data consecutively received from the second electronic device includes media information, the electronic device 100 can determine whether a data type of the message data of the information 233 indicating 'this is a test message 2' displayed previously is the media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the information 233 indicating 'this is a test message 2' is not the media information, the electronic device 100 can constitute an additional bubble 236 in a specific area of the message display area to display a first image 235. The first image 235 displayed by the electronic device 100 can be a thumbnail image acquired from original media information of image information included in the received message data. Likewise, in the following description, images such as a second image, a third image, and the like, can also be a thumbnail image acquired from original media information of image information included in the received message data.

After the first image 235 is displayed, if new message data received consecutively from the second electronic device includes image (i.e., second image) information, the electronic device 100 can determine whether message data received before the received media information from the second electronic device (not shown) is media information.

If the data type of the message data of the first image 235 is the media information, to display a second image 241 in a row with respect to the first image 235 of the message display area, the electronic device 100 can determine whether there is an area capable of displaying the second image 241 in an area parallel to an area in which the first image 235 of the message display area is displayed. If there is the area capable of displaying the first image 235 and the second image 241 in a row, the electronic device 100 can move the bubble 236 of the first image 235 to a determined area 237 in a parallel direction (as indicated by a reference numeral 239).

Figures 2, 2B:
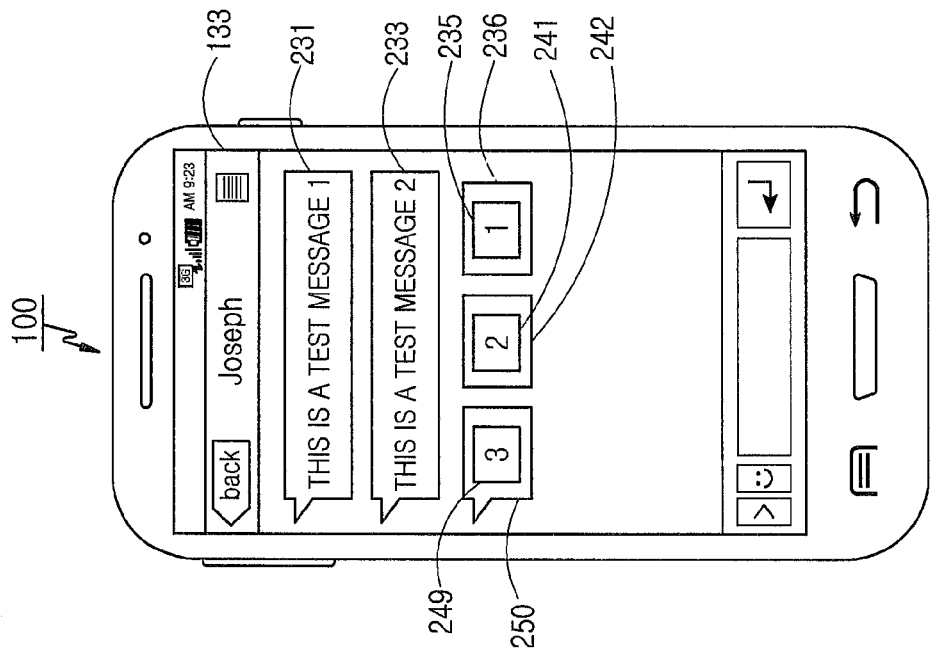
Figures 1, 2B:
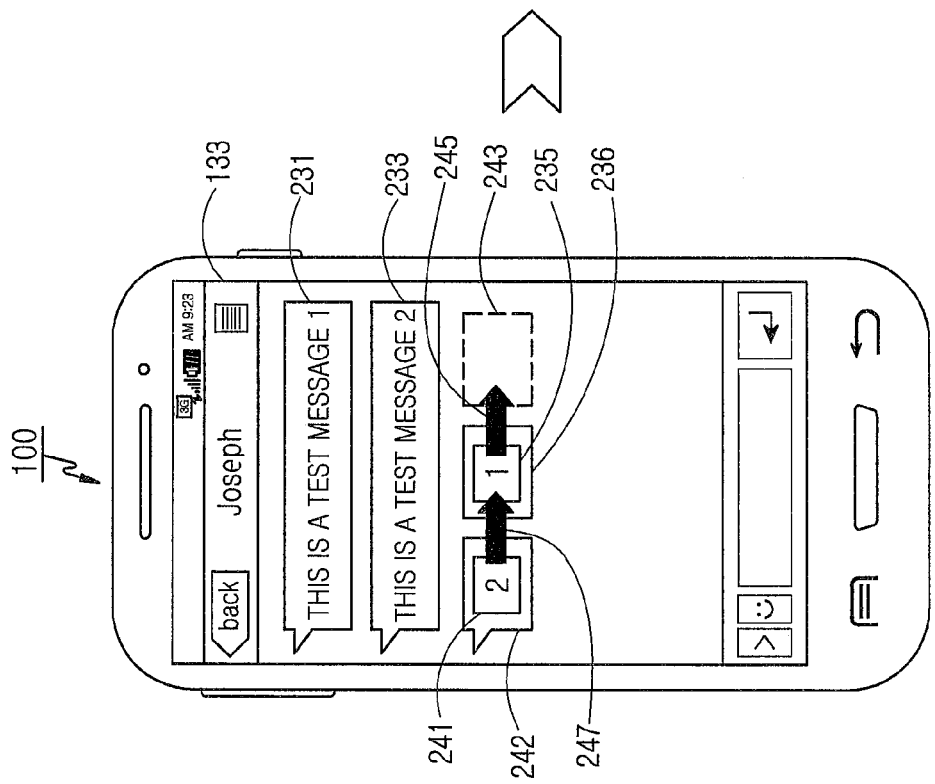

Referring to FIG. 2A-2, the electronic device 100 can constitute and display an additional bubble 242 in an area in which the image bubble 236 of the first image 235 is previously located in FIG. 2A-1.

When the electronic device 100 displays the images included in the received message data to each bubble, without being limited to a state where each of the images is moved together with a bubble including the images (e.g., the first image 235 is moved together with the bubble 236 including the first image 235), an additional bubble can be displayed to the area 237 to which the first image 235 moves, the first image 235 can be moved to the newly generated bubble, and the second image 241 can be displayed to the bubble 236 in which the first image 235 is previously located. Likewise, in the following description, without being limited to a state where an image is moved together with a bubble, the image can be moved in a state where a location of a generated bubble is not moved.

Herein, an operation of displaying images in a row can be a method in which the first image 235 previously displayed is moved to a movable space in an upper, left, or right side, and thereafter the second image 241 having the same size as the first image 235 is displayed to an area in which the first image 235 is located before movement.

Herein, in a method of determining the same size when a portrait-type image and a landscape-type image are received, the same size can be determined to a size by which the portrait-type image is rotated to the landscape-type image or the landscape-type image is rotated to the portrait-type image. For example, if a landscape-type 4×3 image and a portrait-type 3×4 image are received, the size can be determined by a size 3×4 of an image acquired by rotating the landscape-type 4×3 image by 90 degrees and a size 3×4 of the portrait-type 3×4 image.

If the electronic device 100 receives first message data (a message content can be displayed) and consecutively receives second message data and if the second message data includes image information, whether the received first message data includes the image information is determined. If the first message data includes the image information, it is not limited that the first image and the second image must be included in a row. Instead, if the received first message data includes the image information, it is determined whether the consecutively received second message data includes the image information, and if the second message data includes the image information, the first image and the second image can be included in a row. The same will be equally applied to the following descriptions.

Hereinafter, one embodiment of the present disclosure will be described with reference to FIGS. 2B-1 and 2B-2.

Referring to FIG. 2B-1, if media information (i.e., third image) 249 is included in message data which is received from the second electronic device consecutively after the second image 241 is displayed, the electronic device 100 can determine whether a data type of message data of the second image 241 previously displayed is media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the second image 241 is not the media information, the electronic device 100 can construct an additional bubble in a specific area of the message display area to display the bubble (as indicated by a reference numeral 511 of FIG. 5A-1 or 517 of FIG. 5A-2).

If the data type of the message data of the second image 241 is the media information, to display the third image 249 in a row with respect to the displayed first image 235 and second image 241, the electronic device 100 can determine whether there is an area capable of displaying the third image 249 in an area parallel to an area in which the first image 235 or second image 241 of the message display area is displayed. If there is the area capable of displaying the first image 235, the second image 241, and the third image 249 in a row, the electronic device 100 can move the bubble 236 of the first image 235 to a determined area 243 in a parallel direction (as indicated by a reference numeral 245). The electronic device 100 can move a bubble 242 including the second image 241 to an area (i.e., an area in which the bubble 236 exists before movement) in which the bubble 236 including the first image 235 aligned in a parallel direction is previously located (as indicated by a reference numeral 247).

Referring to FIG. 2B-2, the electronic device 100 can display the received third image 249 by constructing an additional bubble 250 in an area in which the bubble 242 including the second image 241 is previously located in FIG. 2B-1.

Hereinafter, one embodiment of the present disclosure will be described with reference to FIGS. 2C-1 and 2C-2.

Referring to FIG. 2C-1, if media information (i.e., fourth image) 251 is included in message data which is received from the second electronic device consecutively after the third image 249 is displayed, the electronic device 100 can determine whether a data type of message data of the second image 241 previously displayed is media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the third image 249 is not the media information, the electronic device 100 can construct and display an additional bubble in a specific area of the message display area. If the data type of the message data of the third image 249 is the media information, to display the fourth image 251 in a row with respect to the first image 235, the second image 241, and the third image 249, the electronic device 100 can determine whether there is an area capable of displaying the fourth image 251 in an area parallel to an area in which the first image 235, the second image 241, or the third image 249 of the message display area is displayed.

Referring to FIG. 2C-2, if an area capable of displaying the first image 235, the second image 241, the third image 249, and the fourth image 251 is not sufficient, the electronic device 100 can display the fourth image 251 by generating a bubble 252 in a specific area of the message display area. Herein, a method of displaying the fourth image can be a typical method of displaying the fourth image if message data received before message data including the fourth image is not the media information.

Hereinafter, one embodiment of the present disclosure will be described with reference to FIGS. 2D-1 and 2D-2.

Figures 2, 2D:
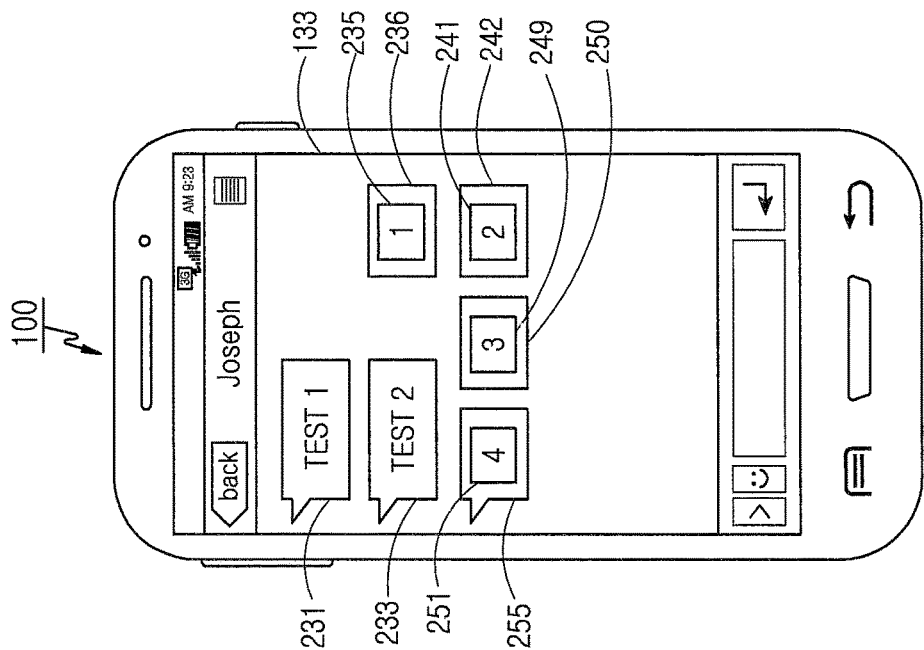
Figures 1, 2D:
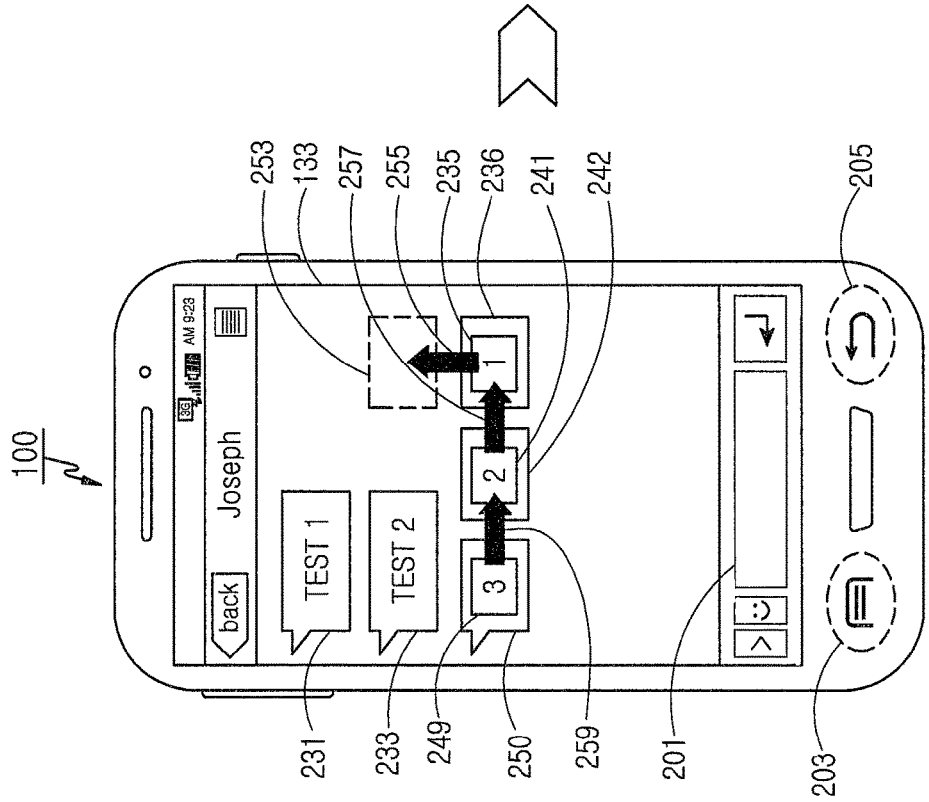

Referring to FIG. 2D-1, if the media information (i.e., fourth image) 251 is included in message data which is received from the second electronic device consecutively after the third image 249 is displayed, the electronic device 100 can determine whether a data type of message data of the third image 249 previously displayed is media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the third image 249 is not the media information, the electronic device 100 can construct and display an additional bubble in a specific area of the message display area (as indicated by a reference numeral 511 of FIG. 5A or 517 of FIG. 5B). If the data type of the message data of the third image 249 is the media information, to display the fourth image 251 in a row with respect to the first image 235, the second image 241, and the third image 249, the electronic device 100 can determine whether there is an area capable of displaying the fourth image 251 in an area parallel to an area in which the first image 235, the second image 241, or the third image 249 of the message display area is displayed. If there is the area capable of displaying the first image 235, the second image 241, and the third image 249 in a row, the electronic device 100 can move the bubble 236 including the first image 235 to a determined area 253 in a parallel direction (as indicated by a reference numeral 255). The electronic device 100 can move the bubble 242 including the second image 241 to an area (i.e., an area in which the bubble 236 exists before movement) in which the bubble 236 including the first image 235 aligned in a parallel direction is previously located (as indicated by a reference numeral 257). The electronic device 100 can move the bubble 250 including the third image 249 to an area (i.e., an area in which the bubble 242 exists before movement) in which the bubble 242 including the second image 241 aligned in a parallel direction is previously located (as indicated by a reference numeral 259).

Referring to FIG. 2B-2, the electronic device 100 can display the received fourth image 251 by constructing an additional bubble 252 in an area in which the bubble 250 including the third image 249 is previously located in FIG. 2D-1.

FIG. 3A to FIG. 3C illustrate an operation of displaying images in a row in an electronic device according to various embodiments of FIG. 1.

The electronic device 100 can receive first media information and display the information to the touch screen 133. If second media information is received consecutively, the electronic device 100 can determine whether a data type of the first media information is media information. If the data type of the first media information is determined as the media information, the electronic device 100 can display the second media information in a row to an area in which the first media information is displayed.

Hereinafter, one embodiment of the present disclosure will be described with reference to FIGS. 3A-1 and 3A-2.

Referring to FIG. 3A-1, the electronic device 100 can display message data transmitted/received with respect to the second electronic device (not shown) by using the chat program 115 to the message display area of the second electronic device. If message data including text information 301 indicating 'this is a test message 1' is received from the second electronic device, the electronic device 100 can constitute the message display area (hereinafter, bubble) in a specific area of the message display area to display the information 301 indicating 'this is a test message 1', and if message data including text information 303 indicating 'this is a test message 2' is received consecutively, the electronic device 100 can constitute an additional bubble in a specific area of the message display area to display the information 303 indicating 'this is a test message 2'.

After the information 303 indicating 'this is a test message 2' is displayed, if new message data consecutively received from the second electronic device includes media information, the electronic device 100 can determine whether a data type of the message data of the information 303 indicating 'this is a test message 2' displayed previously is the media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the information 303 indicating 'this is a test message 2' is not the media information, the electronic device 100 can constitute an additional bubble 305 in a specific area of the message display area to display a first image 307. The first image 307 displayed by the electronic device 100 can be a thumbnail image acquired from original media information of image information included in the received message data. Likewise, in the following description, images such as a second image, a third image, and the like, can also be a thumbnail image acquired from original media information of image information included in the received message data.

After the first image 307 is displayed, if new message data consecutively received from the second electronic device includes image (i.e., second image) information, the electronic device 100 can determine whether message data received before the received media information from the second electronic device (not shown) is media information.

If the data type of the message data of the first image 307 is the media information, to display a second image 309 in a row with respect to the first image 307 of the message display area, the electronic device 100 can determine whether there is an area capable of displaying the second image 309 in an area parallel to an area in which the first image 307 of the message display area is displayed. If there is the area capable of displaying the first image 307 and the second image 309 in a row, the electronic device 100 can extend the bubble 305 of the first image 307 to include the determined area 306 aligned in a parallel direction. The electronic device 100 can move the first image 307 to the area 306 aligned in a parallel direction to the extended bubble 305.

Referring to FIG. 3A-2, the electronic device 100 can display the second image 309 to an area in which the first image 307 is previously located in FIG. 3A-1.

Hereinafter, one embodiment of the present disclosure will be described with reference to FIGS. 3B-1 and 3B-2.

In the description of FIG. 3B-1, referring to FIG. 3A-2, the electronic device 100 can display the second image 309 and consecutively receive new media information (i.e., third image), can extend the bubble 305 including the first image 307 and the second image 309 similarly to the bubble 305 of FIG. 3B-1, and can display the first image 307, the second image 309, and a third image 311.

After the third image 311 is displayed, if new message data received consecutively from the second electronic device includes image (i.e., fourth image) information, the electronic device 100 can determine whether message data received before the received media information from the second electronic device is media information.

If the data type of the message data of the third image 311 is the media information, to display a fourth image 313 in a row with respect to the displayed third image 311, the electronic device 100 can move the images 307, 309, and 311 displayed to the bubble 305 of the message display area within the bubble 305, and can move the first image 307 located at a right edge (boundary) within the bubble 305 to a hidden area. The movement to the hidden area can be an operation in which the image is moved out of a boundary of the bubble 305 together with a visual effect of moving to the right within the bubble 305 of the message display area, and can be a state in which a display location of the first image 307 is persistently stored in the memory 110 of the electronic device 100. The visual effect may not be displayed, and can determine whether to be displayed according to a configuration. Whether to be displayed can also he applied to a visual effect described hereinafter.

Referring to FIG. 3B-2, the electronic device 100 can locate the fourth image 313 to an area in which the third image 311 is previously located in FIG. 3B-1. The electronic device 100 can display an icon 315 to indicate that there is an additional image in a hidden area of the bubble 305, and can display an image (i.e., first image) of the hidden area to the bubble 305 by selecting the icon 315.

Hereinafter, one embodiment of the present disclosure will be described with reference to FIGS. 3C-1 and 3C-2.

In the description of FIG. 3C-1, referring to FIG. 3B-2, the electronic device 100 can display the second image 309, the third image 311, and the fourth image 313 to the bubble 305 of the message display area, and can display the icon 315 to indicate that there is an additional image in a hidden area in a right side of the bubble 305.

If the icon 315 displayed to the bubble is selected, the electronic device 100 can display the first image 307 which is located in the hidden area in a right side of the bubble (precisely, which stores a location and state information in the memory). The electronic device 100 can display the first image 307 and the second image 309 together with a visual effect of moving the second image 309, the third image 311, and the fourth image 313 to the left. When the second image 309, the third image 311, and the fourth image 313 are moved to the left, the electronic device 100 can move the fourth image 307 located at a left edge (boundary) within the bubble 305 to a hidden area. The movement to the hidden area can be an operation in which the image is moved out of a boundary of the bubble 305 together with a visual effect of moving to the left within the bubble 305 of the message display area, and can be a state in which a display location of the first image 307 is persistently stored in the memory 110 of the electronic device 100.

Referring to FIG. 3C-2, the electronic device 100 can locate the first image 307 to an area in which the second image 311 is previously located in FIG. 3C-1. The electronic device 100 can display an icon 319 to indicate that there is an additional image in a hidden area of the bubble 305, and can display an image (i.e., a fourth image) of the hidden area to the bubble 305 by selecting the icon 319.

Hereinafter, one embodiment of the present disclosure will be described with reference to FIGS. 3D-1 and 3D-2.

Figures 2, 3D:
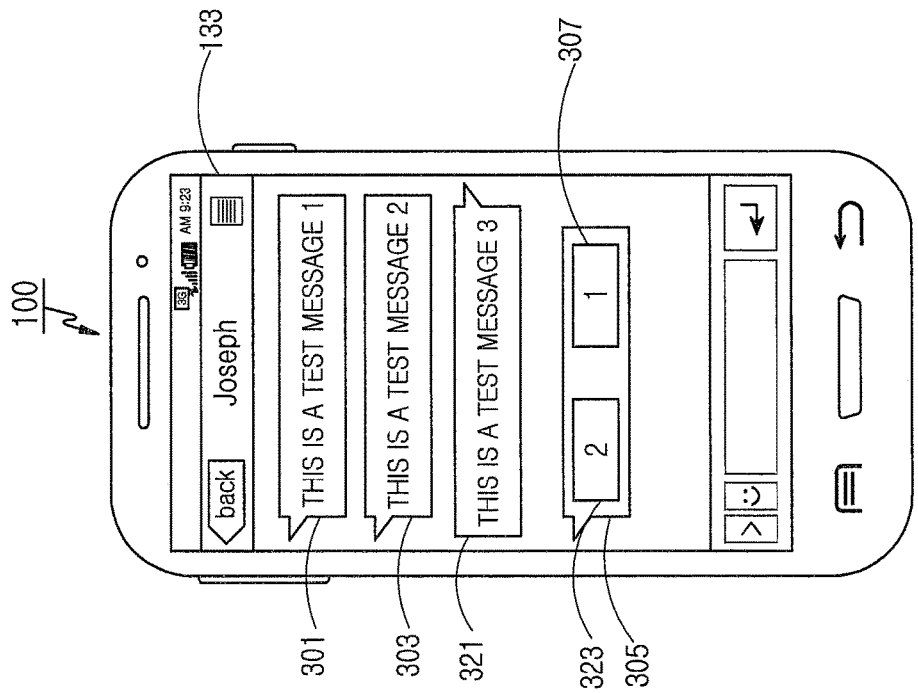
Figures 1, 3D:
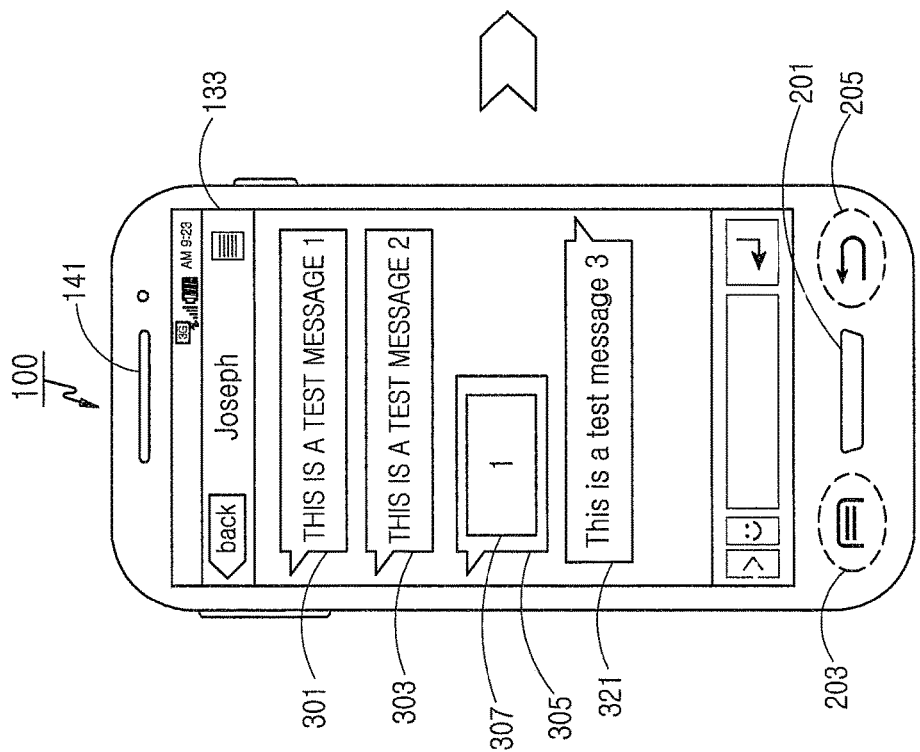

Referring to FIG. 3D-1, the electronic device 100 can display message data transmitted/received with respect to the second electronic device (not shown) by using the chat program 115 to the message display area of the second electronic device. If message data including the text information 301 indicating 'this is a test message 1' is received from the second electronic device, the electronic device 100 can constitute the message display area (hereinafter, bubble) in a specific area of the message display area to display the information 301 indicating 'this is a test message 1', and if message data including the text information 303 indicating 'this is a test message 2' is received consecutively, the electronic device 100 can constitute an additional bubble in a specific area of the message display area to display the information 303 indicating 'this is a test message 2'.

If message data received consecutively from the second electronic device includes media information after the electronic device 100 displays the information 303 indicating 'this is a test message 2', the electronic device 100 can determine whether a data type of the message data of the information 303 indicating 'this is a test message 2' displayed previously is the media information.

The electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

If the data type of the message data of the information 303 indicating 'this is a test message 2' is not the media information, the electronic device 100 can constitute the additional bubble 305 in a specific area of the message display area to display the first image 307. The first image 307 displayed by the electronic device 100 can be a thumbnail image acquired from original media information of image information included in the received message data. Likewise, in the following description, images such as a second image, a third image, and the like, can also be a thumbnail image acquired from original media information of image information included in the received message data.

After the first image 307 is displayed, if new message data received consecutively from the second electronic device does not include image information but is message data including text information 321 indicating 'this is a test message 3', the electronic device 100 can display the information 321 indicating 'this is a test message 3' by constructing an additional bubble in a specific area of the message display area.

After the information 321 indicating 'this is a test message 3' is displayed, if new message data consecutively received from the second electronic device includes image (i.e., second image) information, the electronic device 100 can determine whether the message data received before the received media information is media information.

If the data type of the message data of the first image 307 is the media information, to display the second image 309 in a row with respect to the displayed first image 307, the electronic device 100 can change a location of the first image 307 of the message display area and the bubble 305 displayed by including the first image 307.

Referring to FIG. 3D (2), the electronic device 100 can change the location of the pre-displayed information 321 indicating 'this is a test message 3' and/or the first image 307 to display the first image 307 and the received second image in a row. According to one embodiment, the electronic device 100 can display the information 321 indicating 'this is a test message 3' recently displayed to the message display area after the pre-displayed information 303 indicating 'this is a test message 2'. To display the first image 307, of which a location is moved, and the received second image in a row, the electronic device 100 can extend the bubble 305 including the first image 307, and can display the first image 307 and the second image 323 to the message display area as illustrated in FIG. 3D (2).

FIG. 4 illustrates an operation of displaying received images in a row in an electronic device according to various embodiments of FIG. 1.

The electronic device 100 can receive first media information and display the information to the touch screen 133. If second media information is received consecutively, the electronic device 100 can determine whether a data type of the first media information is media information. If the data type of the first media information is determined as the media information, the electronic device 100 can display the second media information in a row to an area in which the first media information is displayed.

Referring to FIG. 4A, the electronic device 100 can display message data transmitted/received with respect to the second electronic device (not shown) by using the chat program 115 to the message display area of the second electronic device (not shown). If message data including text information 401 indicating 'this is a test message 1' is received from the second electronic device, the electronic device 100 can constitute the message display area (hereinafter, bubble) in a specific area of the message display area to display the information 401 indicating 'this is a test message 1', and if message data including text information 403 indicating 'this is a test message 2' is received consecutively, the electronic device 100 can constitute an additional bubble in a specific area of the message display area to display the information 403 indicating 'this is a test message 2'.

After the information 403 indicating 'this is a test message 2' is displayed, if new message data consecutively received from the second electronic device includes media information, the electronic device 100 can determine whether a data type of the message data of the information 403 indicating 'this is a test message 2' displayed previously is the media information.

If the data type of the message data of the information 403 indicating 'this is a test message 2' is not the media information, the electronic device 100 can constitute an additional bubble 406 in a specific area of the message display area to display a first image 405.

After the first image 405 is displayed, if new message data consecutively received from the second electronic device includes image (i.e., second image) information, the electronic device 100 can determine whether message data received before the received media information from the second electronic device (not shown) is media information.

If the data type of the message data of the first image 405 is the media information, to display a second image 407 in a row with respect to the first image 405 of the message display area, the electronic device 100 can determine whether there is an area capable of displaying the second image 407 in an area parallel to an area in which the first image 405 of the message display area is displayed.

Referring to FIG. 4B, if the second image 407 cannot be displayed in an area parallel to the displayed first image 405, the electronic device 100 can reconfigure a size of the displayed first image 405. When the size of the first image 405 is reconfigured, the electronic device 100 can reconfigure the size to a size by which images can be displayed in a row to the message display area similarly to the first image 405 and the second image 407 of FIG. 4B. After the size of the first image 405 is reconfigured, the electronic device 100 can move a display location together with the bubble 406 similarly to the first image 405 displayed in FIG. 4B. The electronic device 100 can generate and display an additional bubble 408 of the second image having the same size as the reconfigured first image 405. If the first image 405 having the reconfigured size is a thumbnail image acquired from original media information of image information included in the received message data, the electronic device 100 can acquire and display a new image from the original media information.

In addition, when the second image 407 is displayed in a row with respect to the first image 405, the electronic device 100 may not generate the bubble 408 including the second image, and can include the first image 405 and the second image 408 in one bubble 406 by extending the bubble 406 including the first image 405.

Although not shown, without being limited to message data transmission/reception with respect to the second electronic device, also in a multi-user message data transmission/reception state including another electronic device, the electronic device 100 can display image information consecutively received from the same transmitter or image information consecutively transmitted by the electronic device 100 in the message display area with reference to FIG. 2A-1 to FIG. 2D-2, FIG. 3A-1 to FIG. 3C-2, and FIGS. 4A and 4B.

FIG. 5A to FIG. 5C illustrate an operation of displaying received images in a row in an electronic device according to various embodiments of FIG. 1.

When displaying a plurality of pieces of message data transmitted/received with respect to the second electronic device by using the chat program 115, previously displayed message data can be scrolled off the message display area in case of exceeding a size by which message data can be displayed such as an image and text displayed to the message display area, and the electronic device 100 can display previous images not displayed to the screen in a specific area of the message display area by generating a notification window (i.e., bubble or message container).

Hereinafter, one embodiment of the present disclosure will be described with reference to FIGS. 5A-1 and 5A-2.

Referring to FIG. 5A-1, the electronic device 100 can display message data transmitted/received with respect to the second electronic device in the message display area.

A first image 505, a second image 507, and a third image 509 are received consecutively. A bubble 506 including the first image 505, a bubble 508 including the second image 507, and a bubble 510 including the third image 509 can be generated to display the first image 505, the second image 507, and the third image 509, respectively.

The electronic device 100 can determine that message data received before message data including information of a received fourth image 515 is not message data, and display the fourth image 515 by generating an additional bubble 516 in a specific area of the message display area.

Referring to FIG. 5A-2, the electronic device 100 can display message data additionally transmitted/received with respect to the second electronic device in the message display area. The electronic device 100 can display images included in previous message data in an additional notification window.

The electronic device 100 can additionally receive message data including information 517 indicating 'this is a test message 5' and message data including information 519 indicating 'this is a test message 6' after receiving message data including information of the fourth image 515, and can display a content (information) included in newly received message data in the message display area. When the electronic device 100 displays the content of the newly received message data in the message display area, a content of previous message data, which is beyond a limit and thus there is no space to display it, can be scrolled off the message display area in a time order. When the first image 505, the second image 507, and the third image 509 illustrated in FIG. 5A-1 are scrolled off the message display area, the electronic device 100 can display the images moved out of the area by generating an additional notification window 521 at an upper portion of the message display area as illustrated in FIG. 5A-2. The electronic device 100 can display an icon 523 capable of releasing the display of the notification window 521 for displaying previous images or capable of changing the notification window 521 in a hidden state. The electronic device 100 can display the previous images to the notification window 521 including the previous images, for example, the first image 505, the second image 507, and the third image 509, in a row.

Hereinafter, one embodiment of the present disclosure will be described with reference to FIG. 5B.

In the description of FIG. 5B-1, referring to FIG. 5A-1, the electronic device 100 can additionally receive message data including the information 517 indicating 'this is a test message 5' and message data including the information 519 indicating 'this is a test message 6' after receiving message data including information of the fourth image 515, and can display a content (information) included in newly received message data in the message display area. When the electronic device 100 displays the content of the newly received message data in the message display area, it can be controlled such that a content of previous message data, which is beyond a limit and thus there is no space to display it, is scrolled off the message display area in a time order. When the first image 505, the second image 507, and the third image 509 illustrated in FIG. 5A-1 are scrolled off the message display area, the electronic device 100 can display the images moved out of the area by generating the additional notification window 521 at an upper portion of the message display area as illustrated in FIG. 5A-2. The electronic device 100 can display the icon 523 capable of releasing the display of the notification window for displaying previous images or capable of changing the notification window 521 in a hidden state. The electronic device 100 can display the previous images to the notification window 521 including the previous images, for example, the first image 505, the second image 507, and the third image 509, in a row.

Referring to FIG. 5B-2, after displaying the information 519 indicating 'this is a test message 6', the electronic device 100 can receive data of a fifth image 525 to display the fifth image 525 by generating a bubble 526 in a specific area of the message display area, can receive data of information 527 indicating 'this is a test message 7' to display the information 527 indicating 'this is a test message 7' by receiving a bubble 528 in a specific area of the message display area, and can transmit data of a sixth image 529 to display the sixth image 529 by generating a bubble 530 in a specific area of the message display area.

When the electronic device 100 displays the content of the newly received message data in the message display area, it can be controlled such that a content of previous message data, which is beyond a limit and thus there is no space to display it, is scrolled off the message display area in a time order. When the fourth image 515 illustrated in FIG. 5B-1 is scrolled off the message display area, the electronic device 100 can include the image moved out of the area into the notification window 521 displayed to an upper portion of the message display area and thus can display the image in a row with respect to the first image 505, the second image 507, and the third image 509.

In order to display the fourth image 515 in a row with respect to the displayed first image 505, second image 507, and third image 509, the electronic device 100 can move the first image 505, second image 507, and third image 509 displayed to the notification window 521, and can move the first image 505 located at a right edge (boundary) within the notification window 521 to a hidden area of the notification window 521. The movement to the hidden area can be an operation in which the image is moved out of a boundary of the notification window 521 together with a visual effect of moving to the right within the notification window 521, and can be a state in which a display location of the first image 505 is persistently stored in the memory 110 of the electronic device 100. The visual effect may not be displayed, and can determine whether to be displayed according to a configuration. Whether to be displayed can also be applied to a visual effect described hereinafter.

After moving the first image 505, the second image 507, and the third image 509 to the right, the electronic device can locate the fourth image 515 to an area in which the third image 509 previously exists. The electronic device 100 can display an icon 531 to indicate that there is an additional image in a hidden area of the notification window 521, and can display an image (i.e., first image) of the hidden area to the notification window 521 by selecting the icon 531.

A method in which the electronic device 100 displays images to the notification window 521 and displays images located in a hidden area by moving the images can be the same or similar as a method of displaying images to the bubble 305 of FIG. 3B-1 and/or 3C-1 and displaying images located in a hidden area by moving the images.

When it is configured that four images are displayed in a row, the electronic device 100 can display the first image 505, the second image 507, the third image 509, and the fourth image 515 in a row to the notification window 521 without moving the first image 505 to a hidden area. When the four images are displayed in a row, the electronic device 100 can reconfigure each image size, and can reconfigure an interval between the respective images. When reconfiguring each image size, the electronic device 100 can acquire a thumbnail image corresponding to the reconfigured size from original image data.

Hereinafter, one embodiment of the present disclosure will be described with reference to FIGS. 5C-1 and 5C-2.

Referring to FIG. 5C-1, when the electronic device 100 includes images of a previous chat in a notification window displayed in a specific area of the message display area, the images can be included by being classified according to an image type. The electronic device 100 can classify media information into a moving image and a still image by using image information of received message data, and can determine to display both the moving image and the still image to one notification window or to display the images distinctively to separate notification windows.

If the first image 505, third image 509, and fourth image 515 displayed to a notification window 541 are a thumbnail of still image media information, the second image 507 which is not displayed can be a thumbnail of moving image media information. The other way around is also possible, that is, if the first image 505, third image 509, and fourth image 515 displayed to the notification window 541 are a thumbnail of moving image media information, the second image 507 can be a thumbnail of still image media information.

The electronic device 100 can select the icon 523 displayed to the notification window 541 to change the notification window 541 to a display released or hidden state.

Referring to FIG. 5C-2, the electronic device 100 can select the icon 523 of the notification window 541 of FIG. 5C-1 to change the notification window 541 to the display released or hidden state. If the notification window is changed to the hidden state, the electronic device 100 can display the notification window in the display displayed or hidden state to a specific area of the message display area in an icon form.

According to one embodiment, if the first image 505, the third image 509, and the fourth image 515 are a thumbnail of still image media information, the electronic device 100 can display a 'photo' icon 539 corresponding to the notification window 541 in the hidden state.

If the second image 507 which includes the still image and which is not displayed to the notification window 541 is a thumbnail of still image media information, the electronic device 100 can display the second image 507 to an 'image' icon 537 corresponding to a notification window (not shown) including the second image 507 in the hidden state. The electronic device 100 can display an 'all' icon 535 corresponding to the notification window 521 for displaying all images of a previous chat in the hidden state to a specific area of the message display area.

The electronic device 100 can display the notification window 541 including a still image of the first image 505, the third image 509, and the fourth image 515 when the 'photo' icon 539 is selected, can display the 'all' icon 535 to the notification window 521 including a still image and moving image of the first image 505, the second image 507, the third image 509, and the fourth image 515, and can display a notification window (not shown) including a moving image of the second image 507 when the 'image' icon 537 is selected.

FIGS. 6A and 6B illustrate displaying transmitted/received images in a row in an electronic device according to various embodiments of FIG. 1.

When the electronic device 100 displays images of a previous chat to the notification window, an image received by the electronic device 100 and an image transmitted by the electronic device 100 can be distinctively displayed.

Referring to FIG. 6A, if data of a first image 605 is received and then a second image 607 is consecutively received, the electronic device 100 can display the first image 605 and the second image 607 in a row.

Even if the received message data is media information such as a third image 609 and the consecutively transmitted message data is media information, the images may not be displayed in a row when a transmitter or receiver of consecutive media information are different.

According to one embodiment, the electronic device 100 can receive message data for the second image 607 to display the second image 607, and can consecutively transmit message data for the third image 609 to the second electronic device. Even if message data received before the transmitted third image 609 is data including image information, the electronic device 100 may not display the image in a row with respect to second image 607, but can display the third image 609 by including the image to an additional bubble 610 in a specific area of the message display area.

Referring to FIG. 6B, the electronic device 100 can display an image moved out of the message display area to an additional notification window.

The electronic device 100 can additionally receive message data 611 and 613 from the second electronic device in FIG. 6A, and can additionally transmit message data 615 to the second electronic device. The electronic device 100 can display a content of the transmitted/received message data to the message display area by transmitting/receiving message data with respect to the second electronic device. The electronic device 100 can display a content of new message data to the message display area so that images are scrolled to hide a content of a previous chat.

If the first image 605, the second image 607, and the third image 609 in FIG. 6A are scrolled off the message display area, the electronic device 100 can generate an additional notification window 617 to display the first image 605, the second image 607, and the third image 609 to the notification window 617.

The electronic device 100 can receive message data from the second electronic device and display corresponding images by distinguishing the first image 605 and second image 607 displayed to the message display area and the third image 609 transmitted to the second electronic device. According to one embodiment, the electronic device 100 can distinguish the images by differently displaying a boundary color of the first image 605 and second image 607 displayed to the notification window 617 and a boundary color of the third image 609. A method of distinguishing images transmitted/received by the electronic device 100 and displayed to the notification window 607 is not limited to a method of differently displaying a boundary color. Thus, various methods can be used such as a method of displaying a transmitter and a receiver in an image and a method of displaying an indicator capable of distinguishing the transmitter and the receiver in the image.

FIGS. 7A and 7B illustrates displaying received images in a row in an electronic device according to various embodiments of FIG. 1.

When images of a previous chat are displayed to a notification window, the electronic device 100 can determine an image to be displayed to the notification window through filtering according to pre-set information.

Referring to FIG. 7A, the electronic device 100 can display message data transmitted/received with respect to the second electronic device to the message display area according to a transmission/reception time. If an image displayed to the message display area is moved out of the message display area and thus the electronic device 100 intends to display the image in an additional notification window 719, the electronic device 100 can perform filtering on images moved out of the message display area according to information stored in configuration information of the message display control program 116, and can perform filtering on images corresponding to the configuration information to the notification window 719.

According to one embodiment, the electronic device 100 can store the configuration information of the message display control program 116 so that only an image of message data transmitted/received today is displayed to the additional notification window 719.

The electronic device 100 can display a first image 701 received yesterday and a second image 707, third mage 709, and fourth image 711 received today. If message data is additionally received from the second electronic device, the electronic device 100 can display a content of the received message data to the message display area, and the displayed first image 701, second image 707, third image 709, and fourth image 711 can be scrolled off the message display area.

In order to display the images moved out of the area to the additional notification window 719, the electronic device 100 can perform filtering the images moved out of the area by using the configuration information of the message display control program 116, and can display the filtering result to the message display area by including it to the additional notification window.

Referring to FIG. 7B, the electronic device 100 can display the filtered images through the additional notification window according to the configuration information.

According to one embodiment, the electronic device 100 can display a content of message data additionally received, i.e., a fifth image 715, and an additionally transmitted image, i.e., a sixth image 717, to the message display area of FIG. 7A. The electronic device 100 displays the fifth image 715 and the sixth image 717, and thus the first image 701, information 703 indicating 'it is a test message 1', second image 707, third image 709, and fourth image 711 displayed to the message display area are scrolled off the message display area.

The electronic device 100 can store the configuration information of the message display control program 116 so that only an image of message data transmitted/received today is displayed to the additional notification window 719. The electronic device 100 can display the second image 707, third image 709, and fourth image 711 received today to the additional notification window 719 through filtering.

The electronic device 100 can determine a filtering range of images displayed to the additional notification window 719 by changing the configuration information of the message display control program 116.

Figure 8A:
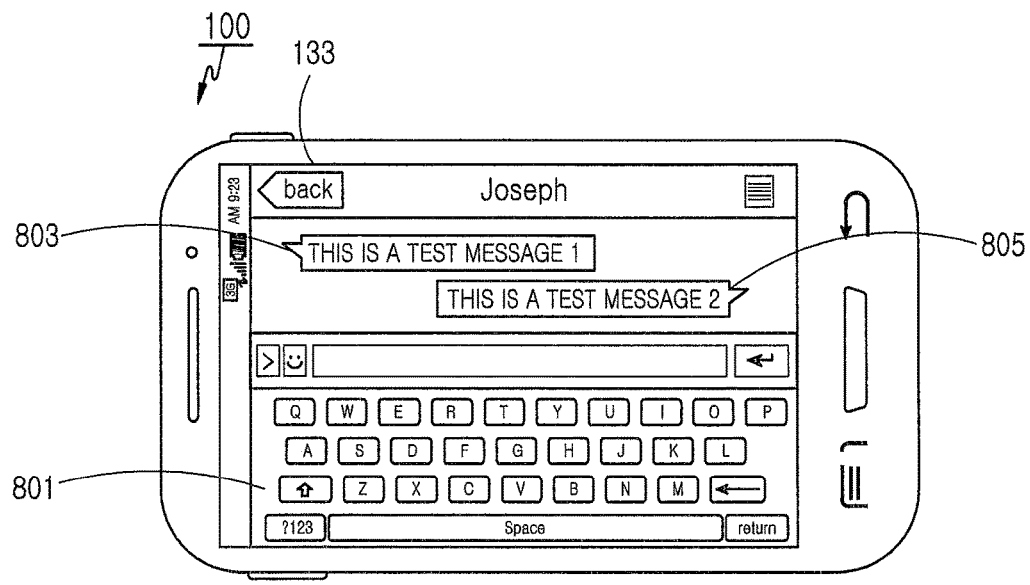
FIGS. 8A and 8B illustrate displaying images in a row in an electronic device according to various embodiments of FIG. 1.
Figure 8B:
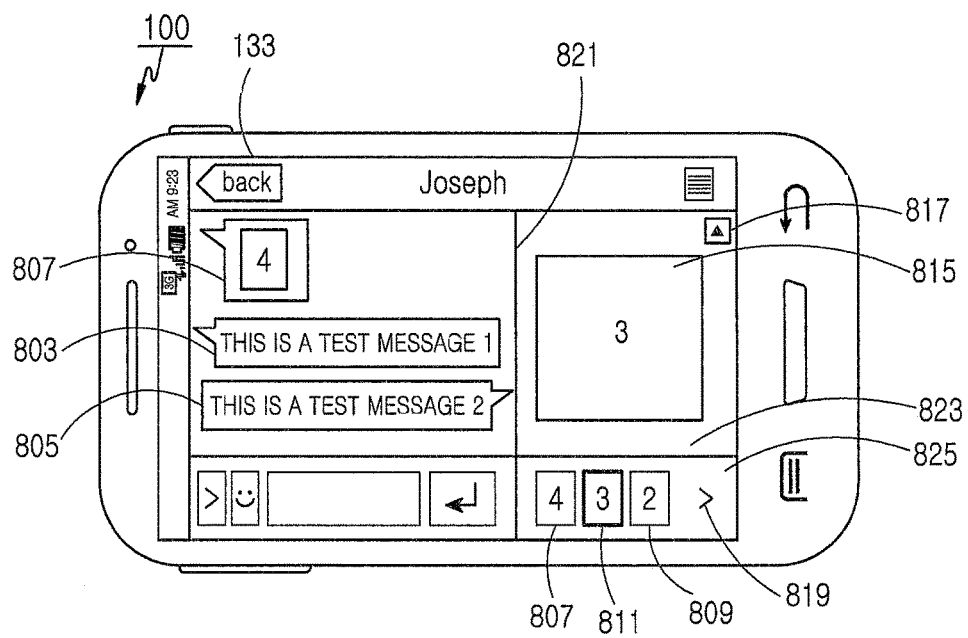

FIGS. 8A and 8B illustrate displaying images in a row in an electronic device according to various embodiments of FIG. 1.

When message data is transmitted/received with respect to the second electronic device by using the chat program 116, the electronic device 100 can display a content of message data in a landscape mode. The electronic device 100 can display images to the message display area in the landscape mode and thereafter can display images moved out of the message display area to an additional notification window.

Referring to FIG. 8A, the electronic device 100 can display a content of message data additionally received in the landscape mode to the message display area or can display a virtual keypad 801 for inputting a message. In this operation, a first image (not shown), second image (not shown), third image (not shown), and fourth image 807 displayed to the message display area can be scrolled off the message display area.

The electronic device 100 may not display the first image (not shown), second image (not shown), third image (not shown), and fourth image 807 which can be displayed through an additional notification window and which is moved out of the message display area, to the message display area in a state where the virtual keypad 801 is displayed as illustrated in FIG. 8A.

Referring to FIG. 8B, if the virtual keypad 801 capable of inputting a message in the landscape mode is not displayed to the message display area, the electronic device 100 can display the first image (not shown), second image (not shown), third image (not shown), and fourth image 807 moved out of the message display area to a notification window 821. When displaying the first image (not shown), the second image (not shown), the third image (not shown), and the fourth image 807 to the notification window 821, the electronic device 100 can display the images moved out of the message display area to a lower area 825 of the notification window according to an order of recently received message data. Referring to the lower area 825 of the notification window 821 of FIG. 8B, the electronic device 100 can display the recently received fourth image 807 to a left side, and can display a third image 811 and a second image 809 in a row according to a reception time order. If it is determined to display the three images to the lower area 825 of the notification window 821, regarding the first image (not shown), the electronic device 100 can store information on a hidden area in a right side of the second image 809 to the memory 110, and can display an icon 819 to indicate that the image exists in the hidden area in the right side of the second image 809. The electronic device 100 can display one image selected from the fourth image 807, third image 811, and second image 809 displayed in a row in the lower area 825 of the notification window 821 to an upper area 823 of the notification window 821. The third image 815 of the upper area of the notification window 821 displayed when the third image 811 is selected from the images displayed to the lower area 825 of the notification window 821 can be an image displayed by acquiring thumbnail data having a new size from original data of the third image 811. The electronic device 100 can display an icon 817 capable of changing the notification window 821 in a display released or hidden state to a specific area of the notification window 821.

If the virtual keypad 801 is not displayed, the electronic device 100 can display a content of message data with a greater size than a case of displaying the virtual keypad 801.

Referring to FIG. 8B, if the display of the virtual keypad 801 is released, the electronic device 100 can display the fourth image 807 in the display released state of the case of displaying the virtual keypad in FIG. 8A. Even if the fourth image 807 moved out of the message display area is displayed again to the message display area, the electronic device 100 can consecutively display the fourth image 807 to an additional notification window.

Figure 9A:
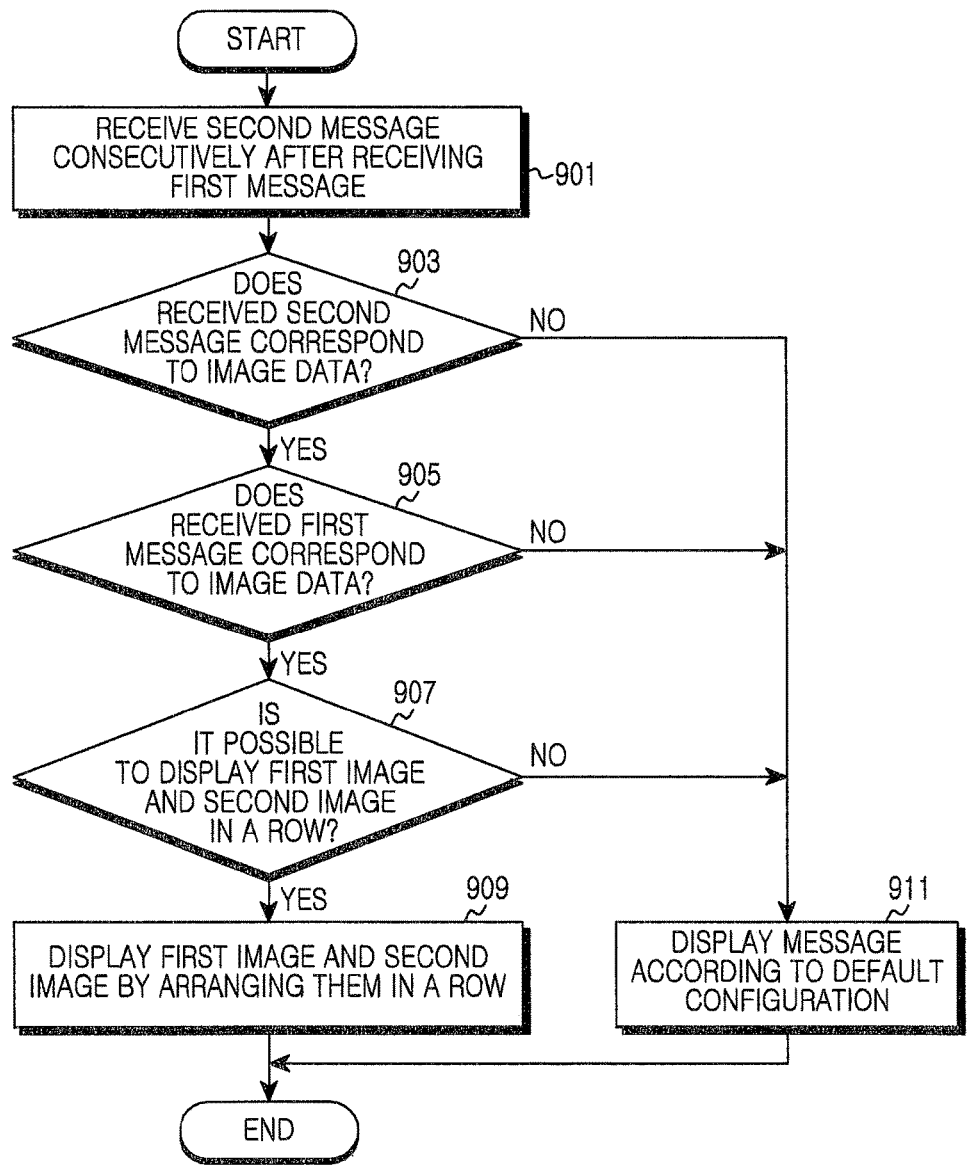
FIG. 9A and FIG. 9B are flowcharts illustrating operations for displaying images in a row in an electronic device according to various embodiments of FIG. 1.
Figure 9B:
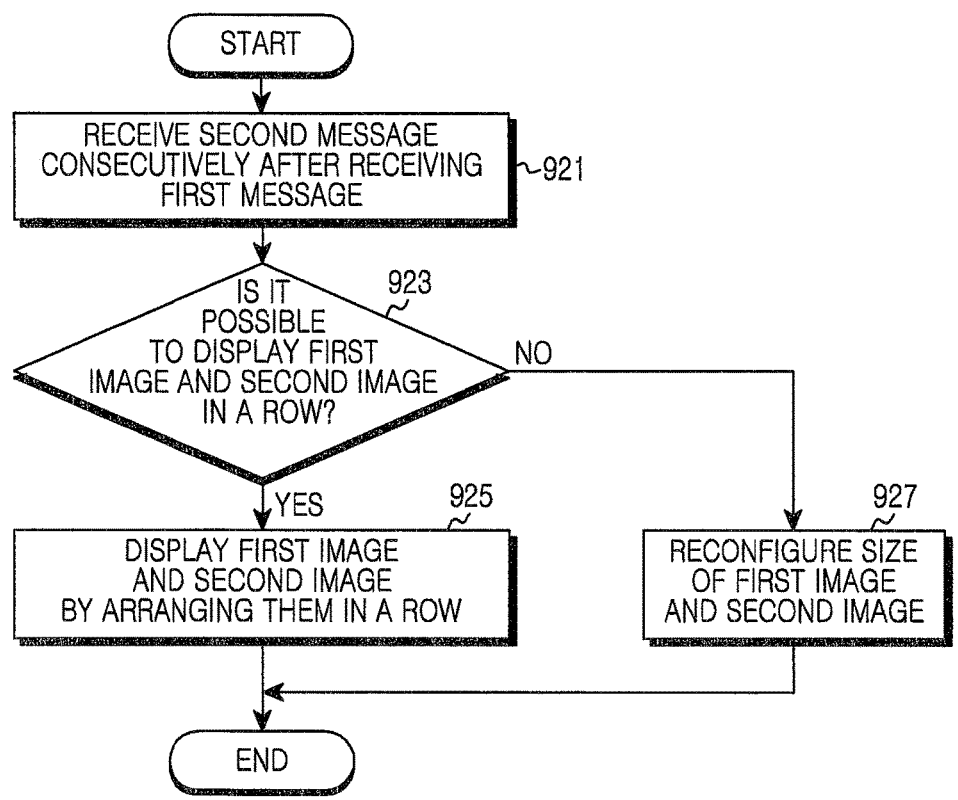

FIG. 9A and FIG. 9B are flowcharts illustrating an operation of displaying images in a row in an electronic device according to various embodiments of FIG. 1.

Hereinafter, one embodiment of the present disclosure will be described with reference to FIG. 9A.

The electronic device 100 can receive first message data from the second electronic device, can consecutively receive second message data, can determine whether the second message data is data including image information, and if it is data including the image information, can determine whether the first message data is data including the image information. The electronic device 100 can determine whether a second image of the second message data can be displayed in a row with respect to a first image of the first message data displayed to the message display area, and if it can be displayed in a row, can display the first image and the second image in a row.

In an operation 901, the electronic device 100 can receive the first message data from the second electronic device, and can consecutively receive the second message data. The electronic device 100 can determine whether a data type of the first message data is image data before receiving the first message data and the second message data, and can display the first message to the message display area.

Herein, when the electronic device 100 determines the data type of the received first message data, the electronic device 100 and the second electronic device can construct a message by including information on the data type of the message information constituting the message data such as a text, a moving image, a still image (i.e., a picture, a photo, and the like), and an audio (i.e., a voice, a music, a sound, and the like). The electronic device 100 can determine the data type of the received message data by using information included in a header of the received message data.

Herein, the image data can be media data such as a moving image, still image (e.g., a picture, a photo, and the like), emoticon, or audio (e.g., voice, music, sound, and the like) included in message data transmitted or received by the electronic device or information on the media data or can be a thumbnail image acquired from information on the media data. In the following description, 'media data' or 'information on the media data' included in the message data transmitted/received by the electronic device 100 can be defined as 'media information', and the 'media data', 'media information', or 'thumbnail image' displayed in the message display area can be defined as an 'image'.

In an operation 903, the electronic device 100 can determine whether the received second message data is image data. The electronic device 100 can determine whether the second message data is the image data by using header information of the received second message data. A method in which the electronic device 100 determines a data type of the second message data can be the same method in which the electronic device 100 determines whether the received first message data is the image data in the operation 901.

If the data type of the received second message data is the image data, the electronic device 100 can perform an operation 905. Otherwise, if it is not the image type, the electronic device 100 can perform an operation 911.

In the operation 905, the electronic device 100 can determine whether the received first message data is the image data. The operation of determining whether the first message data is the image data is for displaying the images in a row to the touch screen 133 or the message display area of the touch screen 133 when the first message data received before the second message data is received is image data in a situation where the second message data is determined to the image data. When determining the data type of the first message data, the electronic device 100 can determine the data type to a data type of first message data information pre-determined in the operation 901 of receiving the first message data and displaying the first message, and if it is confirmed in the operation 905 that the second message data is the image date, can determine the data type by reconfirming the data type of the first message data.

If the data type of the first message data is the image data, the electronic device 100 can perform an operation 907. Otherwise, if the data type is not the image data, the electronic device 100 can perform the operation 911.

In the operation 907, the electronic device 100 can determine whether the first image and the second image can be displayed in a row to the message display area of the touch screen 133.

According to one embodiment, the electronic device 100 can determine whether the second image having the same size as the first image displayed to the message display area can be displayed in the same line either horizontally or vertically as the first image.

If the first image and the second image can be displayed in a row, the electronic device 100 can perform an operation 909, and if not, can perform the operation 911.

In the operation 909, the electronic device 100 can display the first image and the second image to the message display area by arranging the images in a row. When displaying the second image to the message display area, the electronic device 100 can move the first image to an empty space in any one of upper, left, and right sides of the message display area, and can display the second image having the same size as the first image in an area in which the first image is previously displayed.

When the operation 909 is performed, the electronic device 100 can end the operations of FIG. 9A according to the embodiment of the present disclosure.

In the operation 911, the electronic device 100 can display second message data to the message display area according to the typical method of displaying the message data.

If it is determined in the operation 903 that the data type of the received second message data is not the image data, the electronic device 100 can display the first message data and the second message data to a specific area of the message display area instead of arranging the first message data and the second message data in a row.

If it is determined in the operation 905 that the data type of the first message data is not the image data, the electronic device 100 can display the second image to a specific area of the message display area instead of arranging the second image and the first data image in a row.

If the first image and the second image cannot be displayed in a row, the electronic device 100 can display the second image to a specific area of the message display area instead of arranging the second image and the first image in a row.

When the operation 911 is performed, the electronic device 100 can end the operations of FIG. 9A according to the embodiment of FIG. 1.

Hereinafter, one embodiment of the present disclosure will be described with reference to FIG. 9B.

The electronic device 100 can receive first image information (herein, the image information can be image data) from the second electronic device, can consecutively receive second image information, can determine whether a second image can be displayed in a row with respect to a first image displayed to a message display area, and can display the second image in a row with respect to the pre-displayed first image or can reconfigure a size of the first image and display the second image having the same size as the reconfigured first image in a row with respect to the first image.

In an operation 921, the electronic device 100 can receive the first image information from the second electronic device, and can consecutively receive the second image information.

The electronic device can determine whether first message data or second message data includes image data (or whether it indicates a location of image data, hereinafter the same applies). If the first image information of the received first message data is confirmed, before the second image information is received, the electronic device 100 can determine whether message data received before the first image information is received includes image data, and can display the first image of the first image information to the message display area.

Herein, the image information can be media data such as a moving image, still image (e.g., a picture, a photo, and the like), emoticon, or audio (e.g., voice, music, sound, and the like) included in message data transmitted or received by the electronic device or information on the media data or can be a thumbnail image acquired from information on the media data. In the following description, 'media data' or 'information on the media data' included in the message data transmitted/received by the electronic device 100 can be defined as 'media information', and the 'media data', 'media information', or 'thumbnail image' displayed in the message display area can be defined as an 'image'.

If the second image information is received, the electronic device 100 can determine whether the received first image information includes image data. The operation of determining whether the first image information includes image data can be for displaying the first image and the second image in a row to the touch screen 133 or the message display area of the touch screen 133 when the first message data received before the second image information is received includes image data in a situation where it is determined that the second image information includes image data. When determining the data type of the first message data, the electronic device 100 can determine the data type to a data type of first message data information predetermined in the operation of receiving the first message data and displaying the first massage (or image), and if it is confirmed that the second message data is the image date, can determine the data type by reconfirming the data type of the first message data.

In an operation 923, the electronic device 100 can determine whether the first image and the second image can be displayed in a row to the message display area of the touch screen 133.

According to one embodiment, the electronic device 100 can determine whether the second image having the same size as the first image displayed to the message display area can be displayed in the same line either horizontally or vertically as the first image.

If the first image and the second image can be displayed in a row, the electronic device 100 can perform an operation 925, and if not, can perform an operation 927.

In the operation 925, the electronic device 100 can display the first image and the second image to the message display area by arranging the images in a row. When displaying the second image to the message display area, the electronic device 100 can move the first image to an empty space in any one of upper, left, and right sides of the message display area, and can display the second image having the same size as the first image in an area in which the first image is previously displayed.

In the operation 927, if it is determined in step 923 that the first image and the second image cannot be displayed in a row to a specific area of the message display area, the electronic device 100 can display the images by reconfiguring a size of the pre-displayed first image.

According to one embodiment, the electronic device 100 can reconfigure the image to a size by which the first image and the second image can be displayed in a row to a specific area of the message display area. If the first image displayed to the message display area is a thumbnail from an original image, the electronic device 100 can acquire a thumbnail corresponding to the reconfigured size from the original image, can move the first image having the reconfigured size to an empty space in any one of upper, left, and right sides of the message display area, and can display the second image having the same size as the first image in an area in which the first image is previously displayed, by arranging the second image and the first image in a row.

When the operation 925 is performed, the electronic device 100 can end the operations of FIG. 9B according to the embodiment of the present disclosure.

Figure 10:
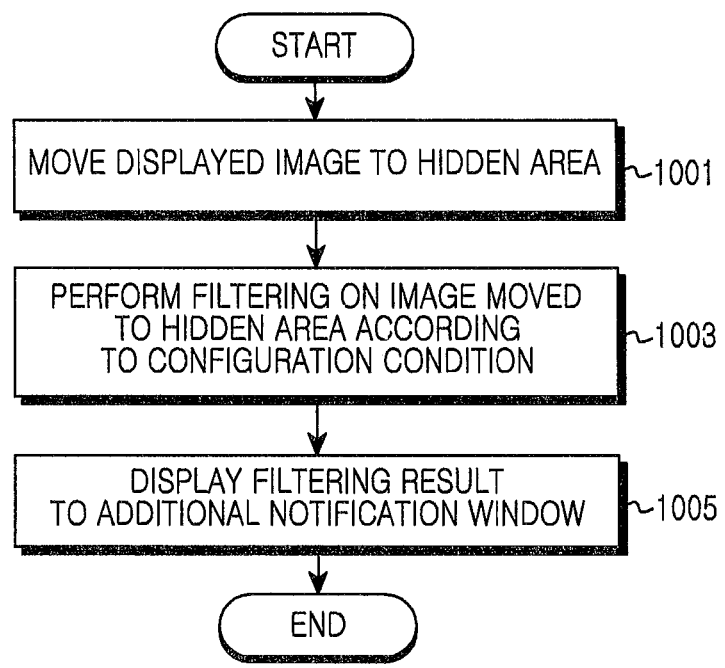
FIG. 10 is a flowchart illustrating operations for displaying images in a row in an electronic device according to various embodiments of FIG. 1.

FIG. 10 is a flowchart illustrating an operation of displaying images in a row in an electronic device according to various embodiments of FIG. 1.

The electronic device 100 can scroll pre-displayed images which are moved out of a message display area due to new messages displayed to the message display area, can acquire information of the images moved out of the area, can perform filtering on information of images acquired according to a configuration, and can generate an additional notification window and display filtering result images to the message display area.

In an operation 1001, the electronic device 100 can scroll images displayed to the message display area of the touch screen 133 so that the images are moved out of the message display area.

The electronic device 100 can display a new message or image so that a message or image displayed to the message display area can be moved out of the message display area. Herein, if the new message or image cannot be displayed anymore to the message display area, the scroll can be controlled so that the message or image can be moved out of the message display area according to an order of displaying it in the message display area. The electronic device 100 can store information of a display time, display location, and the like, of the message or image moved out of the area into the memory 110 and can display again the image or message moved out of the area by performing an operation of scrolling the message display area.

In an operation 1003, the electronic device 100 can perform filtering on the image moved out of the message display area according to configuration information.

The electronic device 100 can change a configuration of the message display area for displaying information of transmitting/receiving data with respect to the second electronic device by using the message display control program 116. When the images moved out of the message display area are displayed by generating an additional notification window in the message display area, the electronic device 100 can perform filtering on the images according to the configuration information and can construct a group.

According to one embodiment, when a transmitter, a moving image, and a still image are determined as a condition for a group construction, the electronic device 100 can construct a group of images by filtering each of a moving image transmitted by the electronic device 100, a still image transmitted by the electronic device 100, a moving image transmitted by the second electronic device, and a still image transmitted by the second electronic device.

In an operation 1005, the electronic device 100 can generate the notification window according to the filtering result, and can display the images to a specific area of the message display area by including the images to the notification window corresponding to the condition. The electronic device 100 can display one predetermined notification window among one or more notification windows according to the configuration information, or can display an icon for displaying notification windows so that one notification window can be selected from the one or more notification windows. The electronic device 100 can select a notification window display released or hidden icon displayed to the notification window to confirm a notification window including an image filtered according to another condition, or can select a notification window capable of confirming images moved out of the message display area at one time irrespective of the condition.

When displaying the images to the notification window, the electronic device 100 can display a specific number of images in a row. The specific number is determined according to configuration information. If the number of images to be displayed to the notification window exceeds the determined number, the electronic device 100 can display an icon, which can confirm an image not displayed to the notification window, to a left or right side of the notification window, and can display an image in a hidden area by scrolling a specific area of the notification window or by selecting the displayed icon.

When the operation 1005 is performed, the electronic device 100 can end the operations of FIG. 10 according to the embodiment of FIG. 1.

The present disclosure provides a method capable of improving a readability of a message in a message display area which displays a multimedia message and text message previously received by an electronic device, simplifying a scrolling operation for confirming messages moved out of the message display area due to a new message display, and conveniently confirming the messages moved out of the message display area.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device 100. The one or more programs include instructions for allowing the electronic device 100 to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number. Further, the program can be stored in an attachable storage device capable of accessing the electronic device 100 through a communication network such as the Internet, an Intranet, a Local Area Network (LAN), a Wide LAN (WLAN), or a Storage Area Network (SAN) or a communication network configured by combining the networks. The storage device can access via an external port to the electronic device 100.

Further, an additional storage unit on a communication network can access to the portable electronic device 100.

While the present disclosure has been particularly shown and described with reference to embodiments thereof, it will be understood by those skilled in the art that various changes in form and details may be made therein without departing from the spirit and scope of the present disclosure as defined by the appended claims.

What is claimed is:

1. A method for operating a messenger application, comprising:
   receiving a first message sent at a first timing from a peer electronic device;
   separating a first image data from a first text data in the first message based on determining that the first message includes the first image data;
   displaying the first text data in the first message in a first line on a screen of the messenger application and the first image data in a second line on the screen of the messenger application;
   receiving a second message sent at a second timing separately from the first message sent at the first timing from the peer electronic device, wherein the second message is received consecutively from the first message;
   separating a second image data from a second text data in the second message based on determining that the second message includes the second image data;
   displaying the second text data in the second message in the first line; and
   displaying the second image data in the second message in the second line in a side of the first image data if the first image data and the second image data are displayable in a same line.

2. The method of claim 1, wherein at least one of the first and second image data is a thumbnail image acquired from the first and the second message, respectively.

3. The method of claim 2, wherein the thumbnail image represents one of still image message, moving image message, audio message, and an emoticon.

4. The method of claim 1, wherein first image data and a second image data are displayed in a message container area, and
   wherein the message container area comprises a scroller to scroll a plurality of image data.

5. The method of claim 1, wherein displaying the second image data comprises:
   moving the first image data to an empty space in the second line; and displaying the second image data in an area where the first image data is previously located.

6. The method of claim 1, wherein displaying the second image data comprises:
displaying the second image data at an end of the screen; and
moving and displaying the first image data on a left or right side of the second image data.

7. The method of claim 1, wherein displaying the second image data comprises:
the first image data and the second image data are displayed in a same size.

8. The method of claim 7, further comprising:
changing a notification window in a disclosed or hidden state by a selection of an indication displayed on the notification window.

9. The method of claim 1, further comprising: when the first line is filled with a plurality of text data, a next text data is displayed in a next row of the second line.

10. The method of claim 1, further comprising:
classifying messages into a plurality of categories; and
displaying each categorized message in each notification window,
wherein the classifying of the messages comprises filtering a message sent by an electronic device and a message sent by the peer electronic device, and generating each group based on the filtering result, and
wherein the displaying of each categorized message comprises displaying a message of a selected group among groups in a notification window.

11. An electronic device capable of operating a messenger application, comprising:
a memory; and
one or more processors,
wherein the one or more processors are configured to:
receive a first message sent at a first timing from a peer electronic device;
separate a first image data from a first text data in the first message based on determining that the first message includes the first image data;
display the first text data in the first message in a first line on a screen of the messenger application and the first image data in a second line on the screen of the messenger application;
receive a second message sent at a second timing separately from the first message sent at the first timing from the peer electronic device, wherein the second message is received consecutively from the first message;
separate a second image data from a second text data in the second message based on determining that the second message includes the second image data;
display the second text data in the second message in the first line; and
display the second image data in the second message in the second line in a side of the first image data if the first image data and the second image data are displayable in a same line.

12. The electronic device of claim 11, wherein at least one of the first and second image data is a thumbnail image acquired from the first or second message, respectively.

13. The electronic device of claim 12, wherein the thumbnail image represents one of still image message, moving image message, audio message, and an emoticon.

14. The electronic device of claim 11, wherein the first image data and the second image data are displayed in a message container area, and wherein the message container area comprises a scroller to scroll a plurality of image data.

15. The electronic device of claim 11, wherein the one or more processors are configured to:
move the first image data to an empty space in the second line; and display the second image data in an area where the first image data is previously located.

16. The electronic device of claim 11, wherein the one or more processors are configured to:
display the second image data at an end of the screen; and
move and display the first image data on a left or right side of the second image data.

17. The electronic device of claim 11, wherein the one or more processors are configured to:
classify messages into a plurality of categories; and
display each categorized message in each notification window,
wherein the classifying of the messages comprising filtering a message sent by the electronic device and a message sent by the peer electronic device, and generating each group based on the filtering result, and
wherein the displaying of each categorized message comprising displaying a message of a selected group among groups in a notification window.

18. The electronic device of claim 17, wherein the first image data and the second image data are displayed in a same size.

19. The electronic device of claim 17, wherein the one or more processors are configured to:
when the first line is filled with a plurality of text data, a next text data is displayed in a next row of the second line.

20. The electronic device of claim 17, wherein one or more notification windows including a message are displayed by selecting an indication displayed on the notification window.

* * * * *